United States Patent
Kim et al.

(10) Patent No.: US 12,363,617 B2
(45) Date of Patent: Jul. 15, 2025

(54) ELECTRONIC DEVICE FOR ACQUIRING CELL AND METHOD OF OPERATING SAME

(71) Applicant: SAMSUNG ELECTRONICS CO., LTD., Suwon-si (KR)

(72) Inventors: Nohsun Kim, Suwon-si (KR); Jungmin Oh, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 462 days.

(21) Appl. No.: 17/859,510

(22) Filed: Jul. 7, 2022

(65) Prior Publication Data

US 2023/0070770 A1 Mar. 9, 2023

Related U.S. Application Data

(63) Continuation of application No. PCT/KR2022/007672, filed on May 30, 2022.

(30) Foreign Application Priority Data

Aug. 30, 2021 (KR) .......................... 10-2021-0114948
Dec. 14, 2021 (KR) .......................... 10-2021-0178765

(51) Int. Cl.
  *H04W 48/16* (2009.01)
  *H04W 4/80* (2018.01)
  (Continued)

(52) U.S. Cl.
  CPC .................................. *H04W 48/16* (2013.01)

(58) Field of Classification Search
  CPC ....... H04W 4/80; H04W 48/16; H04W 60/00; H04W 88/02
  See application file for complete search history.

(56) References Cited

U.S. PATENT DOCUMENTS 9,220,055 B2 * 12/2015 Shin ...................... H04W 48/16
9,706,589 B2 *  7/2017 Fodor ............... H04W 72/1215
(Continued)

FOREIGN PATENT DOCUMENTS

CN       108934006       12/2018
JP         6856671        3/2021
(Continued)

OTHER PUBLICATIONS

Search Report and Written Opinion dated Sep. 1, 2022 issued in International Patent Application No. PCT/KR2022/007672.
(Continued)

*Primary Examiner* — Asghar H Bilgrami
(74) *Attorney, Agent, or Firm* — NIXON & VANDERHYE P.C.

(57) ABSTRACT

Various embodiments of the disclosure relate to an apparatus and a method for rapidly acquiring a cell through direct communication by an electronic device. The electronic device may include: a memory, a first communication circuit, a second communication circuit, and at least one processor, and the processor may be configured to control the electronic device to: acquire a network list corresponding to each of at least one service area, based on the network information of the at least one external electronic device acquired through direct communication using the second communication circuit, acquire a frequency corresponding to the service area in which the electronic device is located, based on the network list based on determining that the service area of the electronic device is changed, and access a cell detected by a network search based on the frequency corresponding to the service area in which the electronic device is located through the first communication circuit.

19 Claims, 11 Drawing Sheets

(51) Int. Cl.
*H04W 60/00* (2009.01)
*H04W 88/02* (2009.01)

(56) References Cited

U.S. PATENT DOCUMENTS

| | | | |
|---|---|---|---|
| 9,807,806 B2 * | 10/2017 | Chen | H04L 67/51 |
| 9,930,717 B2 | 3/2018 | Nair et al. | |
| 10,009,750 B2 * | 6/2018 | Agiwal | H04W 8/005 |
| 10,602,432 B2 | 3/2020 | Kim et al. | |
| 10,694,460 B2 * | 6/2020 | Ingale | H04W 68/005 |
| 11,758,405 B2 * | 9/2023 | Paladugu | H04W 12/08 |
| | | | 726/1 |
| 2007/0147301 A1 | 6/2007 | Noh et al. | |
| 2015/0156635 A1 * | 6/2015 | Liang | H04J 11/0093 |
| | | | 370/328 |
| 2015/0282118 A1 * | 10/2015 | Vaidya | H04W 68/04 |
| | | | 455/458 |
| 2018/0139661 A1 | 5/2018 | Kumar et al. | |
| 2018/0368036 A1 * | 12/2018 | Rune | H04W 36/10 |
| 2019/0132740 A1 * | 5/2019 | De | H04W 12/122 |
| 2019/0132867 A1 | 5/2019 | Karapantelakis | |
| 2019/0335371 A1 | 10/2019 | Shen | |
| 2020/0383017 A1 | 12/2020 | Tsuda et al. | |
| 2021/0076314 A1 * | 3/2021 | Wang | H04B 17/26 |
| 2021/0185577 A1 | 6/2021 | Subramaniam et al. | |
| 2022/0007255 A1 | 1/2022 | Rugeland et al. | |
| 2022/0038998 A1 * | 2/2022 | Taherzadeh Boroujeni | H04W 48/12 |
| 2022/0086743 A1 | 3/2022 | Chun | |
| 2022/0369092 A1 | 11/2022 | Lee et al. | |
| 2023/0070154 A1 * | 3/2023 | Torabian Esfahani | H04W 76/15 |

FOREIGN PATENT DOCUMENTS

| | | | | |
|---|---|---|---|---|
| KR | 10-0713492 | 4/2007 | | |
| KR | 10-1304782 | 9/2013 | | |
| KR | 10-2018-0008533 | 1/2018 | | |
| KR | 10-2500592 | 2/2018 | | |
| KR | 10-2021-0037467 | 4/2021 | | |
| WO | WO-2020032861 A1 * | 2/2020 | | H04W 24/10 |
| WO | 2020-067965 | 4/2020 | | |
| WO | 2020-141956 | 7/2020 | | |
| WO | 2021-167501 | 8/2021 | | |
| WO | WO-2022067779 A1 * | 4/2022 | | H04W 48/08 |

OTHER PUBLICATIONS

Extended European Search Report dated Oct. 25, 2024 for EP Application No. 22864822.6.

* cited by examiner

ELECTRONIC DEVICE FOR ACQUIRING CELL AND METHOD OF OPERATING SAME

CROSS-REFERENCE TO RELATED APPLICATIONS

This application is a continuation of International Application No. PCT/KR2022/007672 designating the United States, filed on May 30, 2022, in the Korean Intellectual Property Receiving Office and claiming priority to Korean Patent Application No. 10-2021-0114948, filed on Aug. 30, 2021, in the Korean Intellectual Property Office, and to Korean Patent Application No. 10-2021-0178765, filed on Dec. 14, 2021, in the Korean Intellectual Property Office, the disclosures of all of which are incorporated by reference herein in their entireties.

BACKGROUND

Field

The disclosure relates to an apparatus and a method for rapidly acquiring a cell by an electronic device through direct communication.

Description of Related Art

An electronic device in a wireless communication system may select a cell which the electronic device accesses for wireless communication. For example, the electronic device may detect at least one cell which the electronic device can access through a network search in all frequency bands which can be supported by the electronic device. The electronic device may determine whether the at least one detected cell can be accessed through the network search. The electronic device may perform access to (for example, camp on) a specific cell determined to be accessible.

When power is supplied to the electronic device or the electronic device escapes a shaded area, the electronic device may perform a network search in order to search for a cell which the electronic device will access (or will be registered). For example, when power is supplied to the electronic device or the electronic device escapes the shaded area, the electronic device may acquire information related to a PLMN stored in a subscriber identity module (SIMB) of the electronic device. For example, the information related to the PLMN may include information related to a registered public land mobile network (RPLMN), home PLMN (HPLMN), and/or a preferred PLMN (PPLMN). When a registered PLMN, a home PLMN, and/or a preferred PLMN are not found through the network search based on the information related to the PLMN, the electronic device may perform a network search (for example, full band scan) for all frequency bands which can be supported by the electronic device.

When the network search (for example, full band scan) is performed, the electronic device may identify at least one frequency band in which a signal (or energy) is detected through a first search (for example, power scan or raw scan). The electronic device may identify at least one frequency satisfying a predetermined signal quality (for example, received signal strength indicator (RSSI)) through a second search (for example, fine scan) for at least one frequency band in which the signal is detected. The electronic device may access a specific cell detected through cell acquisition for at least one frequency satisfying the predetermined signal quality. For example, cell acquisition may include a series of operations for identifying whether the electronic device can perform wireless communication through the corresponding frequency.

The electronic device may have a time delay due to the network search by a time spent for performing the first scan, the second scan, and the cell acquisition in order to detect the cell which the electronic device will access.

SUMMARY

Embodiments of the disclosure provide an apparatus and a method for reducing the delay time due to the network search in the electronic device.

According to various example embodiments, an electronic device includes: a memory, a first communication circuit configured to support cellular communication, a second communication circuit configured to support direct communication, and at least one processor operatively connected to the memory, the first communication circuit, and the second communication circuit, wherein the processor is configured to control the electronic device to: acquire network information of at least one external electronic device through direct communication using the second communication circuit, acquire a network list corresponding to each of at least one service area, based on the network information of the at least one external electronic device, acquire information related to a service area in which the electronic device is located through the first communication circuit based on the cellular communication based on the first communication circuit being activated, acquire a frequency corresponding to the service area in which the electronic device is located, based on the network list based on determining that the service area of the electronic device is changed, perform a network search based on the frequency corresponding to the service area in which the electronic device is located, and access a cell detected by the network search through the first communication circuit.

According to various example embodiments, a method of operating an electronic device includes: acquiring network information of at least one external electronic device through direct communication, acquiring a network list corresponding to each of at least one service area, based on the network information of the at least one external electronic device, based on cellular communication of the electronic device being activated, acquiring information related to a service area in which the electronic device is located through the cellular communication, based on determining that the service area of the electronic device is changed, acquiring a frequency corresponding to the service area in which the electronic device is located, based on the network list, performing a network search based on the frequency corresponding to the service area in which the electronic device is located, and accessing a cell detected by the network search through the first communication circuit.

According to various example embodiments of the disclosure, the electronic device can reduce time spent for a network search by selecting at least one frequency to perform the network search in a service area (for example, country) in which the electronic device is located based on network information of at least one external electronic device acquired through direct communication (for example, device-to-device (D2D)).

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various embodiments will be described in greater detail with reference to attached drawings.

Figure 1:
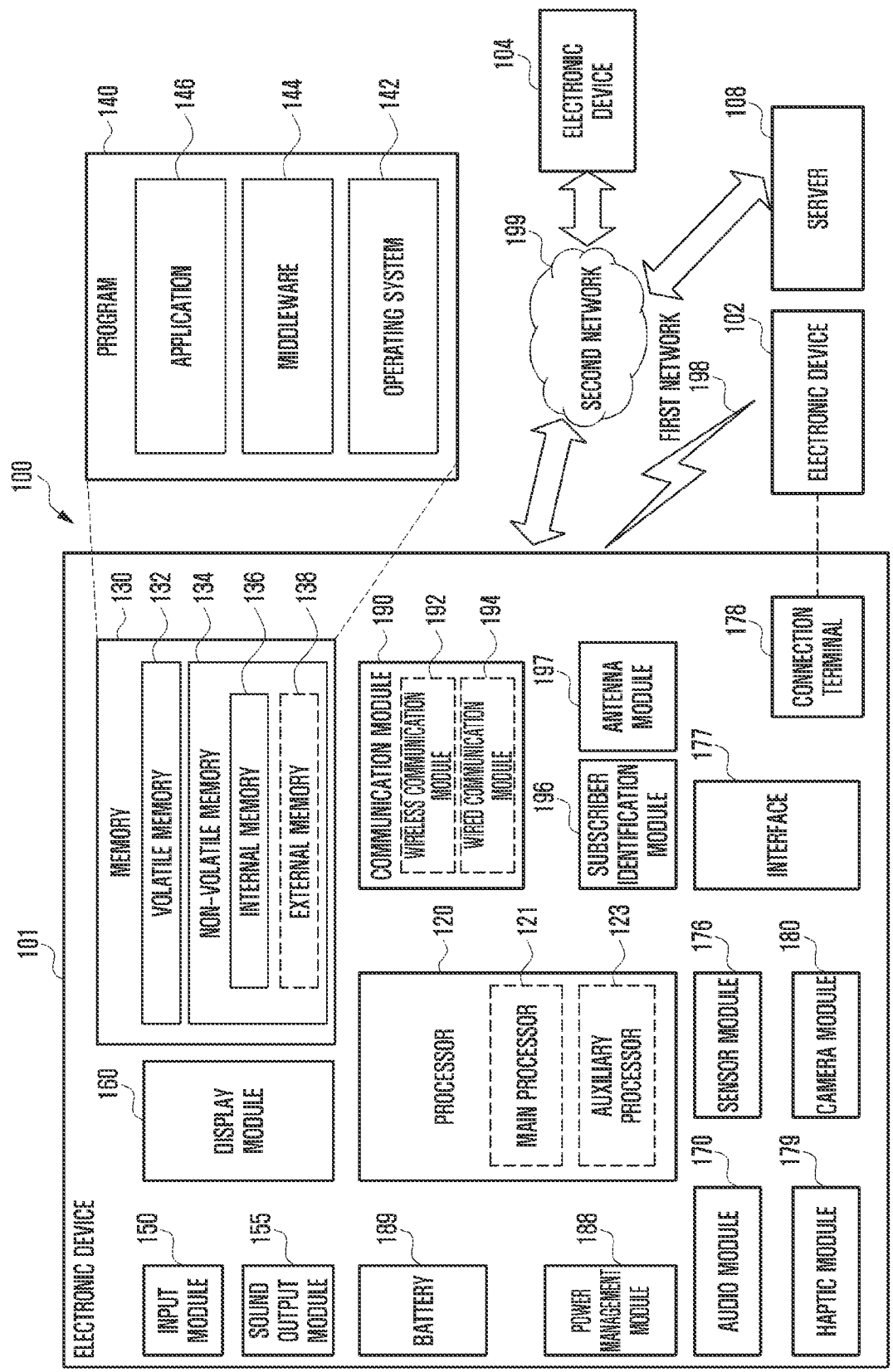
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. The subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
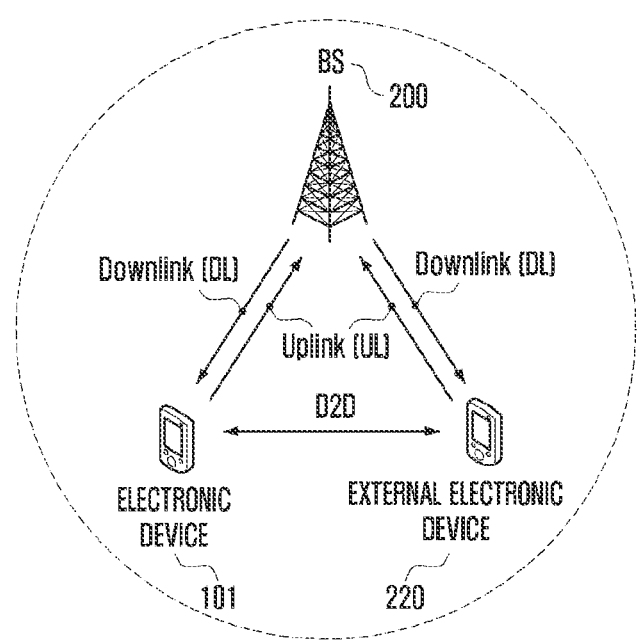
FIG. 2 is a diagram illustrating an example of a wireless communication system supporting direct communication according to various embodiments.

FIG. 2 is a diagram illustrating an example of a wireless communication system supporting direct communication according to various embodiments.

According to various embodiments made with reference to FIG. 2, an external electronic device 220 may be located within the coverage of a BS 200. According to an embodiment, the external electronic device 220 may receive data and/or signals (for example, control information) from the BS 200 through a downlink (DL). The external electronic device 220 may transmit data and/or signals (for example, control information) to the BS 200 through an uplink (UL). For example, the coverage of the BS 200 may include an area (or a service area) in which transmission and/or reception of data and/or signals to and/or from the BS 200 are possible.

According to various embodiments, the electronic device 101 may transmit and/or receive data and/or signals (for example, control information) to and/or from the external electronic device 220 through direct communication (for example, device to device (D2D)). For example, direct communication may be performed based on a short-range communication network such as Bluetooth low energy (BLE), WLAN (for example, Wi-Fi), Bluetooth, and/or ultra-wideband (UWB). For example, direct communication may support multi-peer connectivity framework (MCF).

According to various embodiments, the electronic device 101 may access the BS 200 based on network information received from the external electronic device 220 through direct communication. According to an embodiment, when the electronic device 101 enters the coverage of the BS 200, the electronic device 101 may acquire network information (for example, frequency) related to the BS 200 from the external electronic device 220 through direct communication. The electronic device 101 may perform a network search based on network information (for example, frequency) related to the BS 200. The electronic device 101 may access the BS 200 detected through the network search based on network information related to the BS 200. According to an embodiment, the electronic device 101 may receive data and/or signals (for example, control information) from the BS 200 through the downlink (DL) based on access to the BS 200. The electronic device 101 may transmit data and/or signals (for example, control information) to the BS 200 through an uplink (UL) based on access to the BS 200.

Figure 3:
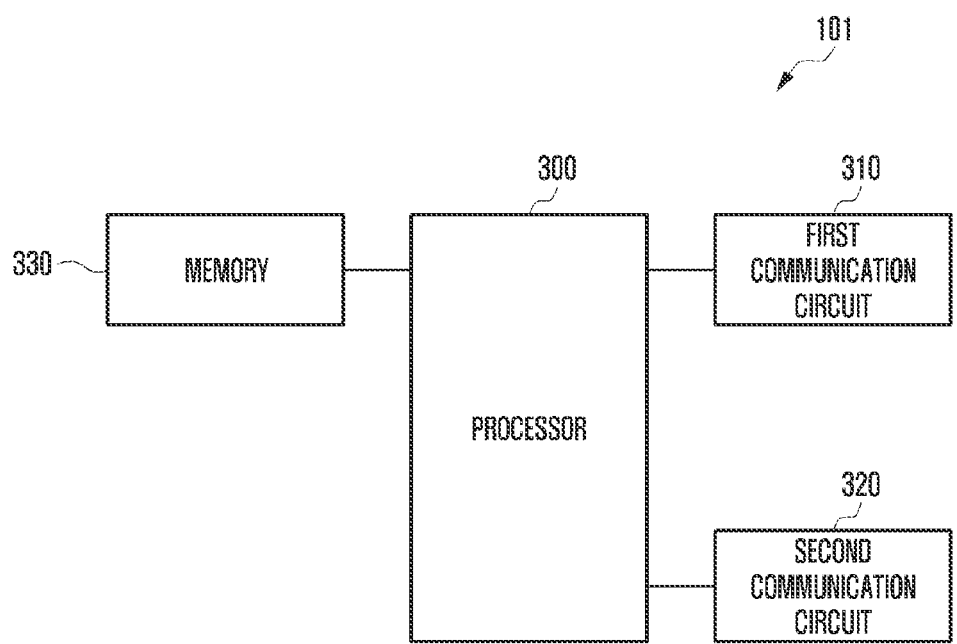
FIG. 3 is a block diagram illustrating an example configuration of an electronic device for acquiring a cell according to various embodiments.

FIG. 3 is a block diagram illustrating an example configuration of an electronic device for acquiring a cell according to various embodiments.

According to various embodiments made with reference to FIG. 3, the electronic device 101 may include a processor (e.g., including processing circuitry) 300, a first communication circuit 310, a second communication circuit 320, and/or a memory 330. According to an embodiment, the processor 300 may be substantially the same as the processor 120 of FIG. 1 or may include the processor 120. The first communication circuit 310 and/or the second communication circuit 320 may be substantially the same as the wireless communication module 192 of FIG. 1 or may include the wireless communication module 192. The memory 330 may be substantially the same as the memory 130 of FIG. 1 or may include the memory 130. According to an embodiment, the processor 300 may be operatively connected to the first communication circuit 310, the second communication circuit 320, and/or the memory 330. For example, the processor 300 may include a communication processor (CP).

According to various embodiments, the processor 300 may include various processing circuitry and may control the electronic device 101 to acquire network information of at least one external electronic device 220 through direct communication using the second communication circuit 320. According to an embodiment, the processor 300 may control the second communication circuit 320 to transmit a request message related to network information based on a predetermined network information acquisition period. The processor 300 may identify network information of at least one external electronic device 220 in a response message related to the network information received through the second communication circuit 320 in response to the request message related to the network information. For example, the request message related to the network information may include indication information related to the request for the network information. For example, the response message related to the network information may include indication information related to the network information response and/or the network information of the external electronic device 220. For example, the network information of the external electronic device 220 may include information related to at least one of a PLMN of the external electronic device, a radio access technology (RAT), a cell frequency, or a time point at which registration in the network is performed. For example, the PLMN of the external electronic device 220 may include information related to a PLMN of the network in which the external electronic device 220 is registered and/or was registered (for example, a mobile country code (MCC) and/or a mobile network code (MNC)). For example, the RAT of the external electronic device 220 may include information related to the RAT of the network in which the external electronic device 220 is registered and/or was registered. For example, the cell frequency may include information related to a frequency of the cell which in which the external electronic device 220 accesses and/or has accessed.

According to an embodiment, the processor 300 may update a predetermined (e.g., specified) period for acquiring network information of the external electronic device 220 based on an update condition related to the network information acquisition period. For example, when it is determined that the update condition related to the network information acquisition period is satisfied, the processor 300 may update (for example, expand) the predetermined period for acquiring the network information of the external electronic device 220) by a predetermined interval. For example, the state in which the update condition related to the network information acquisition period is satisfied may include a state in which a time during which the service area (for example, country) of the electronic device 101 is maintained exceeds a predetermined reference maintenance time. For example, the state in which the update condition related to the network information acquisition period is satisfied may include a state in which the number of acquisitions of the network information of the external electronic device 220 based on the predetermined period (or the same period) exceeds a predetermined reference number. For example, the predetermined interval may vary depending on the time during which the service area (for example, country) of the electronic device 101 is maintained. For example, when it is determined that the update condition related to the network information acquisition period is not satisfied, the processor 300 may maintain the predetermined period for acquiring the network information of the external electronic device 220. For example, the state in which the update condition related to the network information acquisition period is not satisfied may include a state in which the time during which the service area (for example, country) of the electronic device 101 is maintained is equal to or shorter than the predetermined reference maintenance time. For example, the state in which the update condition related to the network information acquisition period is not satisfied may include a state in which the number of acquisitions of the network information of the external electronic device 220 based on the predetermined period (or the same period) is equal to or smaller than the predetermined reference number. For example, the service area (for example, country) may include an area in which the same communication service provider operates at least one cellular network.

According to an embodiment, the processor 300 may control the second communication circuit 320 to acquire network information of at least one external electronic device 220 through direct communication based on scheduling information related to the electronic device 101. For example, when it is identified that the electronic device 101 is scheduled to move to another service area (for example, another country) based on scheduling information related to the electronic device 101, the processor 300 may control the second communication circuit 320 to acquire the network information of the external electronic device 220 based on the predetermined network information acquisition period.

According to various embodiments, the processor 300 may generate or update a network list of the electronic device 101 based on the network information of at least one external electronic device 220 acquired through direct communication. According to an embodiment, the processor 300 may acquire network information related to at least one service area (for example, country) based on the network information of the electronic device 101 stored in the memory 330 and/or the network information of at least one external electronic device 220 acquired through direct communication. The processor 300 may generate or update the network list of the electronic device 101 based on network information related to at least one service area. For example, the network list of the electronic device 101 may include information related to a network in which the electronic device 101 can be registered (or which the electronic device 101 can access) for each service area (for example, country) (for example, a mobile network code (MNC)) and/or information related to a frequency which can be used when the electronic device 101 is registered in the network (or the electronic device 101 accesses the network) (for example, an absolute radio frequency channel number (ARFCN)). For example, the information related to the network in which the electronic device 101 can be registered (or which the electronic device 101 can access) and/or the information related to the frequency which can be used when the electronic device 101 is registered in the network (or the electronic device 101 accesses the network), included in the network list of the electronic device 101 may be arranged based on a time point at which registration in the network is performed and/or information (for example, priority) related to network service providers stored in a subscriber identity module of the electronic device 101. For example, the network information of the electronic device 101 may include network information stored in a subscriber identity module (SIM) (not shown) of the electronic device 101 and/or a non-volatile area of the memory 330. For example, the network information of the electronic device 101 may include information related to at least one of the PLMN, RAT, cell frequency, or network registration time point of the electronic device 101. For example, the PLMN of the electronic device 101 may include information related to the PLMN of the network in which the electronic device 101 is registered and/or was registered (for example, MCC and/or MNC). For example, the RAT of the electronic device 101 may include information related to the RAT of the network in which the electronic device 101 is registered and/or was registered. For example, the cell frequency may include information related to a frequency of the cell which the electronic device 101 accesses and/or has accessed.

According to various embodiments, when the first communication circuit 310 in an inactive state switches to an active state, the processor 300 may identify whether the service area (for example, country) in which the electronic device 101 is located is changed. According to an embodiment, when the first communication circuit 310 in the inactive state switches to the active state, the processor 300 may control the first communication circuit 310 to perform a network search related to a registered public land mobile network (PLMN) through the first communication circuit 310. The processor 300 may acquire information related to the MCC and/or the MNC of the area in which the electronic device 101 is located through the network search related to the registered PLMN. When it is determined that the service area (for example, country) in which the electronic device 101 is located is changed based on information related to the MCC and/or the MNC of the area in which the electronic device 101 is located, the processor 300 may determine that the electronic device 101 is in a roaming state. For example, the roaming state may include a state in which the electronic device 101 moves to another service area (for example, country) having a different communication service provider operating the network. For example, the state in which the first communication circuit 310 in the inactive state switches to the active state may include a state in which power is supplied to the electronic device 101 (for example, power on), a state in which a flight mode of the electronic device 101 is released, and/or a state in which power is supplied to the first communication circuit 310. For example, the network search related to the registered PLMN may include a series of operations for performing the network search related to a frequency associated with registered PLMN stored in the memory 330.

According to various embodiments, when it is determined that the service area (for example, country) in which the electronic device 101 is located is changed, the processor 300 may identify a frequency corresponding to the service area (for example, country) in which the electronic device 101 is located based on the network list of the electronic device 101. According to an embodiment, the processor 300 may identify information related to a preferred PLMN (PPLMN) corresponding to the service area (for example, country) in which the electronic device 101 is located in the subscriber identity module of the electronic device 101. The processor 300 may control the first communication circuit 310 to perform a network search related to the preferred PLMN. For example, the network search related to the preferred PLMN may include a series of operations for performing a network search related to a frequency band (or a frequency) of the preferred PLMN. For example, when a candidate PLMN is detected through the network search related to the preferred PLMN, the processor 300 may detect the service area (for example, country) in which the electronic device 101 is located and a frequency corresponding to the candidate PLMN in the network list of the electronic device 101. For example, the service area (for example, country) in which the electronic device 101 is located and the frequency corresponding to the candidate PLMN may be selected based on a priority configured based on a time point at which registration in the network is performed and/or a network service provider stored in the subscriber identity module of the electronic device 101. For example, the candidate PLMN may indicate a PLMN to which the electronic device 101 attempts access. For example, when no PLMN is detected through the network search related to the preferred PLMN, the processor 300 may identify a candidate PLMN corresponding to the service area (for example, country) in which the electronic device 101 is located and a frequency corresponding to the candidate PLMN in the network list of the electronic device 101. For example, the candidate PLMN corresponding to the service area (for example, country) in which the electronic device 101 is located and the frequency corresponding to the candidate PLMN may be selected based on a priority configured based on a time point at which registration in the network is performed and/or information related to a network service provider stored in the subscriber identity module of the electronic device 101.

According to various embodiments, the processor 300 may control the first communication circuit 310 to perform a network search related to the frequency corresponding to the service area (for example, country) in which the electronic device 101 is located. According to an embodiment, the processor 300 may identify whether a cell of the candidate PLMN is detected through the network search based on the frequency corresponding to the area (for example, country) using the first communication circuit 310.

According to various embodiments, the processor 300 may control the first communication circuit 310 to perform an access procedure with the cell detected through the network search related to the frequency corresponding to the service area (for example, country) in which the electronic device 101 is located. According to an embodiment, the processor 300 may select a cell (for example, best cell) which the electronic device 101 will access based on a signal quality of the cell detected through a network search related to the frequency corresponding to the service area (for example, country) in which the electronic device 101 is located. The processor 300 may control the first communication circuit 310 to perform a procedure of accessing the cell which the electronic device 101 will access. For example, the signal quality of the cell may include at least one of reference signal received power (RSRP), reference signal received quality (RSRQ), received signal strength indicator (RSSI), or signal to interference plus noise ratio (SINR).

According to various embodiments, the first communication circuit 310 may support cellular communication of the electronic device 101. According to an embodiment, the first communication circuit 310 may support cellular communication with a network element (for example, the BS 200 of FIG. 2) through a cellular network. For example, the first communication circuit 310 may include a radio frequency integrated circuit (RFIC) and a radio frequency front end (RFFE) for cellular communication. For example, the cellular network may include a 2G network (for example, global system for mobile communications (GSM)), a 3G network (for example, universal mobile telecommunications system (UMTS)), a 4G network (for example, long-term evolution (LTE)), and/or a 5G network (for example, new radio (NR)).

According to various embodiments, the second communication circuit 320 may support direct communication of the electronic device 101. According to an embodiment, the second communication circuit 320 may transmit and/or receive data and/or control information to/from at least one external electronic device 220 through direct communication. For example, the direct communication may be performed based on a short-range communication network such as at least one of WLAN (for example, Wi-Fi), Bluetooth, BLE, or UWB. According to an embodiment, the first communication circuit 310 and the second communication circuit 320 may be logically (for example, in software) separated. According to an embodiment, the first communication circuit 310 and the second communication circuit 320 may be configured as different circuits or different hardware components.

According to various embodiments, the memory 330 may store various pieces of data used by at least one element of the electronic device 101 (for example, the processor 300, the first communication circuit 310, and/or the second communication circuit 320). According to an embodiment, data may include the network information of the electronic device 101, the network list of the electronic device 101, and/or the network information of the external electronic device 220. According to an embodiment, the memory 330 may store various instructions which can be executed through the processor 300.

According to various embodiments, the electronic device 101 (For example, the processor 300) may identify the service area (for example, country) in which the electronic device 101 is located based on at least one of a global navigation satellite system (GNSS), a phone number, a carrier portability code (CPC), an international mobile equipment identity (IMEI), an international mobile subscriber identity (IMSI), a mobile network code (MNC), wireless fidelity (Wi-Fi), or a data network (for example, an IP address).

According to various embodiments, the processor 300 may include an application processor (AP) and/or a communication processor (CP). According to an embodiment, the application processor may control the second communication circuit 320 to acquire network information of at least one external electronic device 220 through direct communication. According to an embodiment, the application processor may generate and/or update the network list of the electronic device 101 based on the network information of at least one external electronic device 220 acquired through the second communication circuit 320 and the network information of the electronic device 101 received from the first communication circuit 310 (or the communication processor).

According to various embodiments, the external electronic device 220 may share the network information of the external electronic device 220 with the electronic device 101 through direct communication. According to an embodiment, when receiving a request message related to the network information through direct communication, the external electronic device 220 may identify whether the request message related to the network information satisfies a predetermined sharing condition. When it is determined that the request message related to the network information satisfies the predetermined sharing condition, the external electronic device 220 may transmit the network information of the external electronic device 220 to the electronic device 101 through direct communication. For example, the state in which the predetermined sharing condition is satisfied may include a state in which identification information of the electronic device 101 related to direct communication is included in identification information configured for sharing the network information. For example, the identification information of the electronic device 101 may include a communication service provider (for example, a home PLMN) operating the cellular network which can be supported by the electronic device 101, a manufacturer of the electronic device 101, and/or a predefined sharing identity (ID).

According to various example embodiments, an electronic device (for example, the electronic device 101 of FIG. 1, 2, or 3) may include a memory (for example, the memory 130 of FIG. 1 or the memory 330 of FIG. 3), a first communication circuit (for example, the wireless communication module 192 of FIG. 1 or the first communication circuit 310 of FIG. 3) configured to support cellular communication, a second communication circuit (for example, the wireless communication module 192 of FIG. 1 or the second communication circuit 320 of FIG. 3) configured to support direct communication, and at least one processor (for example, the processor 120 of FIG. 1 or the processor 300 of FIG. 3) operatively connected to the memory, the first communication circuit, and the second communication circuit, and the processor is configured to control the electronic device to: acquire network information of at least one external electronic device through direct communication using the second communication circuit, acquire a network list corresponding to each of at least one service area, based on the network information of the at least one external electronic device, acquire information related to a service area in which the electronic device is located through the first communication circuit based on the cellular communication based on the first communication circuit being activated, acquire a frequency corresponding to the service area in which the electronic device is located, based on the network list based on determining that the service area of the electronic device is changed, perform a network search based on the frequency corresponding to the service area in which the electronic device is located, and access a cell detected by the network search through the first communication circuit.

According to various example embodiments, the processor may be configured to generate and/or update the network list corresponding to each of the at least one service area, based on network information of the electronic device stored in the memory and/or the network information of the at least one external electronic device.

According to various example embodiments, the network information of the electronic device may include at least one piece of information related to a public land mobile network (PLMN) in which the electronic device is registered or was registered, a radio access technology (RAT), a network frequency, or a registration time point.

According to various example embodiments, the network list corresponding to each service area may be arranged based on the network registration time point.

According to various example embodiments, the network information of the external electronic device may include at least one piece of information related to a PLMN in which the external electronic device is registered or was registered, an RAT, a network frequency, or a registration time point.

According to various example embodiments, based on determining that the service area of the electronic device is changed, the processor may be configured to acquire information related to a registered PLMN of the service area in which the electronic device is located and, based on a candidate PLMN being detected through a network search related to the registered PLMN, select a frequency corresponding to the service area in which the electronic device is located and the candidate PLMN from the network list.

According to various example embodiments, based on no candidate PLMN being detected through the network search related to the registered PLMN, the processor may be configured to select a candidate PLMN corresponding to the service area in which the electronic device is located from the network list and select the frequency corresponding to the service area in which the electronic device is located and the candidate PLMN from the network list.

According to various example embodiments, the processor may be configured to periodically acquire the network information of the at least one external electronic device based on a specified period through the direct communication using the second communication circuit.

According to various example embodiments, the processor may be configured to update the specified period, based on a time during which the service area of the electronic device is maintained and/or a number of acquisitions of the network information of the external electronic device.

According to various example embodiments, the processor may be configured to acquire information related to a schedule stored in the memory and, based on the electronic device being scheduled to move to another service area, based on the information related to the schedule, periodically acquire the network information of the at least one external electronic device based on a specified period through the direct communication using the second communication circuit.

Figure 4:
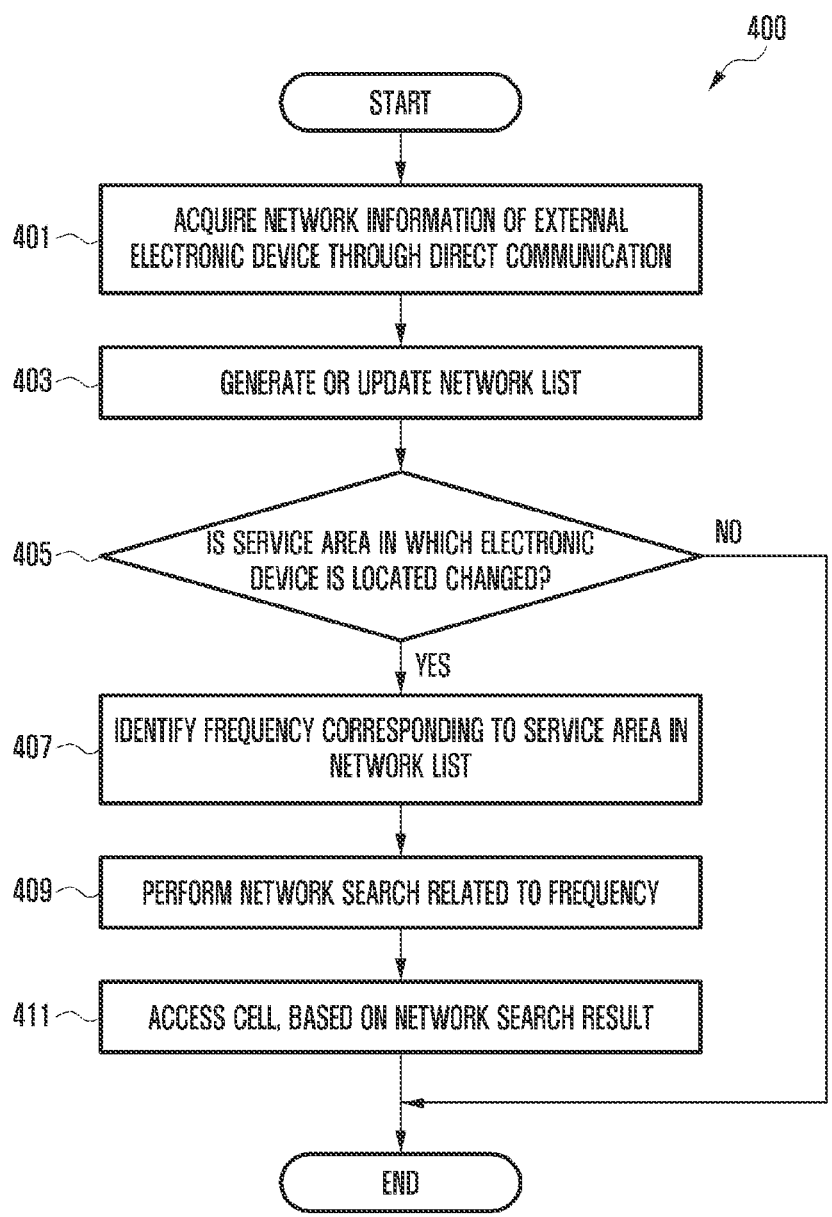
FIG. 4 is a flowchart illustrating an example process in which the electronic device is registered in a network according to various embodiments.

FIG. 4 is a flowchart 400 illustrating an example process of registration of the electronic device in the network according to various embodiments. In the following embodiments, respective operations may be sequentially performed but the sequential performance is not necessary. For example, orders of the operations may be changed, and at least two operations may be performed in parallel. For example, the electronic device of FIG. 4 may be the electronic device 101 of FIG. 1, 2, or 3.

According to various embodiments made with reference to FIG. 4, the electronic device (for example, the processor 120 of FIG. 1 or the processor 300 of FIG. 3) may acquire network information of at least one external electronic device 220 through direct communication in operation 401. According to an embodiment, the processor 300 may control the second communication circuit 320 to transmit a request message related to network information based on a predetermined network information acquisition period. The processor 300 may identify network information of at least one external electronic device 220 in a response message related to the network information received through the second communication circuit 320 in response to the request message related to the network information. For example, the predetermined network information acquisition period may be updated based on a time during which the service area (for example, country) of the electronic device 101 is maintained. For example, when it is identified that the electronic device 101 is scheduled to move to another service area (for example, another country) based on scheduling information related to the electronic device 101, the processor 300 may control the second communication circuit 320 to acquire the network information of the external electronic device 220 based on the predetermined network information acquisition period. For example, the network information of the external electronic device 220 may include information related to at least one of a PLMN of the external electronic device, a radio access technology (RAT), a cell frequency, or a time point at which registration in the network is performed.

According to various embodiments, the electronic device (for example, the processor 120 or 300) may generate or update the network list of the electronic device 101 based on the network information of at least one external electronic device 220 acquired through direct communication in operation 403. According to an embodiment, the processor 300 may acquire network information related to at least one service area (for example, country) based on the network information of the electronic device 101 stored in the memory 330 and/or the network information of at least one external electronic device 220 acquired through direct communication. The processor 300 may generate or update the network list of the electronic device 101 based on network information related to at least one service area. For example, the network list of the electronic device 101 may include information (for example, MNC) related to a network in which the electronic device 101 can be registered for each service area (for example, country) and information (for example, ARFCN) related to a frequency which can used for registering the electronic device 101 in the network as shown in [Table 1].

TABLE 1

| MCC1 | MNC1-1 | ARFCN1, ARFCN2, ARFCN3 |
| --- | --- | --- |
| | MNC1-2 | ARFCN4, ARFCN5 |
| | MNC1-3 | ARFCN6, ARFCN7, ARFCN8, ARFCN9 |
| MCC2 | MNC2-1 | ARFCN11, ARFCN12, ARFCN13 |
| | MNC2-2 | ARFCN14, ARFCN15, ARFCN16 |
| MCC3 | MNC3-1 | ARFCN17, ARFCN18, ARFCN19 |
| | MNC3-2 | ARFCN20, ARFCN21, ARFCN22 |
| | MNC3-3 | ARFCN23, ARFCN24 |

For example, the information related to the network in which the electronic device 101 can be registered, included in the network list of the electronic device 101 and the information related to the frequency which can be used for registering the electronic device 101 in the network may be arranged based on a time point at which registration in the network is performed and/or information (for example, priority) related to a network service provider stored in the subscriber identity module of the electronic device 101.

According to various embodiments, the electronic device (for example, the processor 120 or 300) may identify whether the service area (for example, country) in which the electronic device 101 is located is changed in operation 405. According to an embodiment, when the first communication circuit 310 in the inactive state switches to the active state, the processor 300 may identify whether the service area (for example, country) in which the electronic device 101 is located is changed. For example, when the first communication circuit 310 in the inactive state switches to the active state, the processor 300 may control the first communication circuit 310 to perform a network search related to a registered PLMN (RPLMN) through the first communication circuit 310. The processor 300 may acquire information related to the MCC and/or the MNC of the area in which the electronic device 101 is located through the network search related to the registered PLMN. When it is determined that the service area (for example, country) in which the electronic device 101 is located is changed based on information related to the MCC and/or the MNC of the area in which the electronic device 101 is located, the processor 300 may determine that the electronic device 101 is in a roaming state. For example, the roaming state may include a state in which the electronic device 101 moves to another service area (for example, country) having a different communication service provider operating the network. For example, the state in which the first communication circuit 310 in the inactive state switches to the active state may include a state in which power is supplied to the electronic device 101 (for example, power on), a state in which a flight mode of the electronic device 101 is released, and/or a state in which power is supplied to the first communication circuit 310. For example, the network search related to the registered PLMN may include a series of operations for performing the network search related to a frequency associated with registered PLMN stored in the memory 330.

According to various embodiments, when it is determined that the service area (for example, country) in which the electronic device 101 is located is not changed (for example, 'No' of operation 405), the electronic device (for example, the processor 120 or 300) may end embodiment process for registration in the network. According to an embodiment, when a network related to the registered PLMN is found, the processor 300 may determine that the service area (for example, country) in which the electronic device 101 is located is not changed. According to an embodiment, the processor 300 may determine that the service area (for example, country) in which the electronic device 101 is located is not changed based on information (for example, MCC and/or MNC) related to the service area (for example, country) in which the electronic device 101 is located, acquired through the network search related to the registered PLMN. According to an embodiment, when it is determined that the service area (for example, country) in which the electronic device 101 is located is not changed, the processor 300 may control the first communication circuit 310 to perform a network search in all frequency bands which can be supported by the registered PLMN. The processor 300 may control the first communication circuit 310 to access the cell detected through the network search.

According to various embodiments, when it is determined that the service area (for example, country) in which the electronic device 101 is located is changed (for example, 'Yes' of operation 405), the electronic device (for example, the processor 120 or 300) may identify a frequency corresponding to the service area (for example, country) in which the electronic device 101 is located based on the network list of the electronic device 101 in operation 407. According to an embodiment, the processor 300 may control the first communication circuit 310 to perform a network search related to a preferred PLMN (PPLMN) corresponding to the service area (for example, country) in which the electronic device 101 is located, stored in the subscriber identity module of the electronic device 101. For example, the network search related to the preferred PLMN may include a series of operations for performing a network search related to a frequency band (or a frequency) of the preferred PLMN. For example, when a candidate PLMN is detected through the network search related to the preferred PLMN, the processor 300 may detect the service area (for example, country) in which the electronic device 101 is located and a frequency corresponding to the candidate PLMN in the network list of the electronic device 101. For example, the candidate PLMN may indicate a PLMN to which the electronic device 101 attempts access. For example, when no PLMN is detected through the network search related to the preferred PLMN, the processor 300 may identify a candidate PLMN corresponding to the service area (for example, country) in which the electronic device 101 is located and a frequency corresponding to the candidate PLMN in the network list of the electronic device 101.

According to various embodiments, the electronic device (for example, the processor 120 or 300) may perform a network search related to a frequency corresponding to the service area (for example, country) in which the electronic device 101 is located in operation 409. According to an embodiment, the processor 300 may identify whether a cell of the candidate PLMN is detected through the network search based on the frequency corresponding to the area (for example, country) using the first communication circuit 310.

According to various embodiments, the electronic device (for example, the processor 120 or 300) may perform a procedure of registration in the network through the cell (e.g., access the cell) detected by the network search related to the frequency corresponding to the service area (for example, country) in which the electronic device 101 is located in operation 411. According to an embodiment, the processor 300 may select a cell (for example, best cell) which the electronic device 101 will access based on a signal quality of at least one cell detected through the network search related to the frequency corresponding to service area (for example, country) in which the electronic device 101 is located. The processor 300 may control the first communication circuit 310 to perform a procedure of accessing the cell which the electronic device 101 will access. For example, the signal quality of the cell may include at least one of RSRP, RSRQ, RSSI, or SINR.

According to various embodiments, the electronic device 101 may perform the network search related to the selected frequency based on the network list of the electronic device 101 in the state (for example, roaming state) in which the service area (for example, country) in which the electronic device 101 is located is changed, thereby further reducing a time delay by the network search compared to the case in which the network search for all frequencies which can be supported by the electronic device 101 is performed.

According to various embodiments, when the cell which the electronic device 101 can access is not detected through the network search related to the frequency corresponding to the candidate PLMN acquired in the network list of the electronic device 101, the electronic device 101 may perform a network search related to a frequency having the next priority included in the network list.

According to various embodiments, when the cell which the electronic device 101 can access is not detected through the network search using at least one frequency included in the network list of the electronic device 101, the electronic device 101 may perform the network search for all frequencies (or frequency bands) which can be supported by the candidate PLMN.

According to various embodiments, when access to the cell detected through the network search related to the frequency corresponding to the candidate PLMN fails, the electronic device 101 may perform the network search related to the frequency having the next priority included in the network list.

According to various embodiments, when access to the cell detected through the network search using at least one frequency included in the network list of the electronic device 101 fails, the electronic device 101 may perform the network search for all frequencies (or frequency bands) which can be supported by the candidate PLMN.

Figure 5:
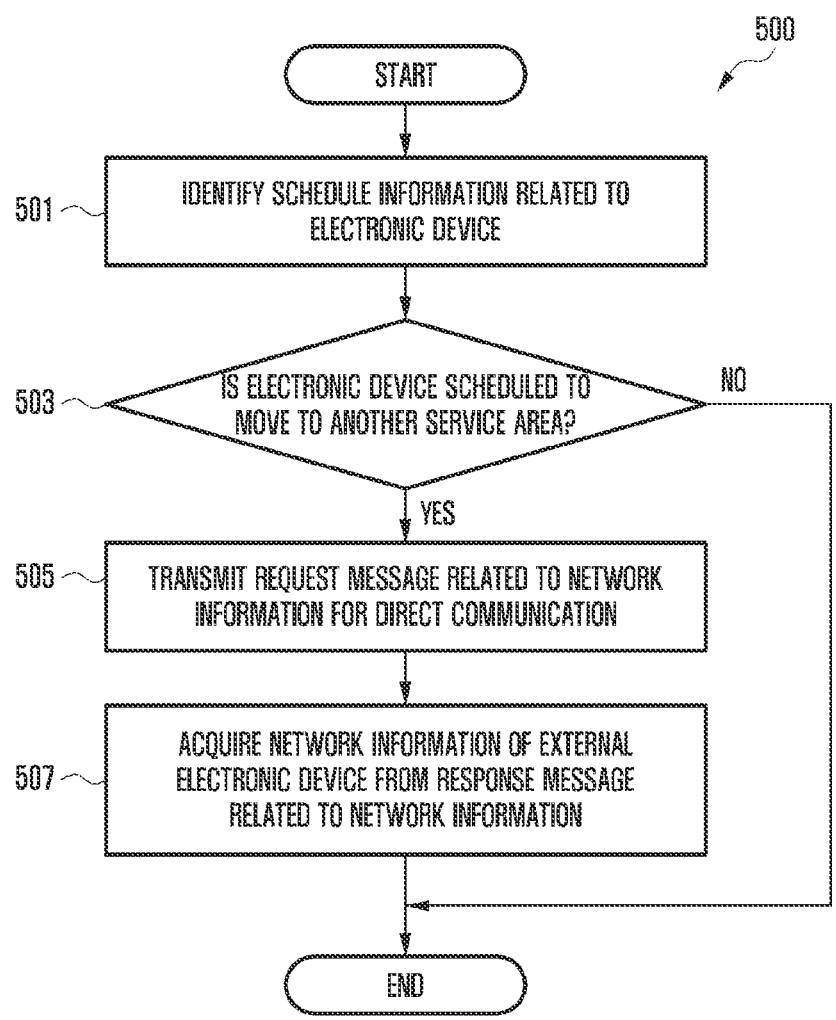
FIG. 5 is a flowchart illustrating an example process in which the electronic device acquires network information of an external electronic device according to various embodiments.

FIG. 5 is a flowchart 500 illustrating an example process in which the electronic device acquires network information of the external electronic device according to various embodiments. According to an embodiment, at least some of FIG. 5 may be a detailed operation of operation 401 of FIG. 4. In the following embodiments, respective operations may be sequentially performed but the sequential performance is not necessary. For example, orders of the operations may be changed, and at least two operations may be performed in parallel. For example, the electronic device of FIG. 5 may be the electronic device 101 of FIG. 1, 2, or 3.

According to various embodiments made with reference to FIG. 5, the electronic device (for example, the processor 120 of FIG. 1 or the processor 300 of FIG. 3) may identify schedule information related to the electronic device 101 in operation 501. For example, the schedule information related to the electronic device 101 may be stored in the memory 330 and/or a server (for example, the server 106 of FIG. 1).

According to various embodiments, the electronic device (for example, the processor 120 or 300) may identify whether the electronic device 101 is scheduled to move to another service area (for example, another country) based on schedule information related to the electronic device 101 in operation 503. For example, the schedule of moving to another service area (for example, another country) may include information related to an overseas trip or overseas business trip of the user of the electronic device 101.

According to various embodiments, when the electronic device 101 is not scheduled to move to another service area (for example, another country) (for example, 'No' of operation 503), the electronic device (for example, the processor 120 or 300) may end the process for acquiring network information of the external electronic device.

According to various embodiments, when the electronic device 101 is scheduled to move to another service area (for example, another country) (for example, 'Yes' of operation 503), the electronic device (for example, the processor 120 or 300) may transmit a request message related to the network information through direct communication in operation 505. For example, the request message related to the network information may include indication information related to the request for the network information.

According to various embodiments, the electronic device (for example, the processor 120 or 300) may identify or acquire network information of at least one external electronic device 220 in a response message related to the network information received through direct communication in response to the request message related to the network information in operation 507. For example, the response message related to the network information may include indication information related to the network information response and/or the network information of the external electronic device 220. For example, the network information of the external electronic device 220 may include information related to at least one of the PLMN, RAT, cell frequency, or network registration time point of the electronic device 220.

According to various embodiments, when the electronic device 101 is scheduled to move to another service area (for example, another country), the electronic device 101 may periodically acquire the network information of at least one external electronic device 220 through direct communication according to a predetermined network information acquisition period. According to an embodiment, when the electronic device 101 is scheduled to move to another service area (for example, another country), the processor 300 may control the second communication circuit 320 to repeatedly perform operations 505 and 507 periodically according to the predetermined network information acquisition period.

Figure 6:
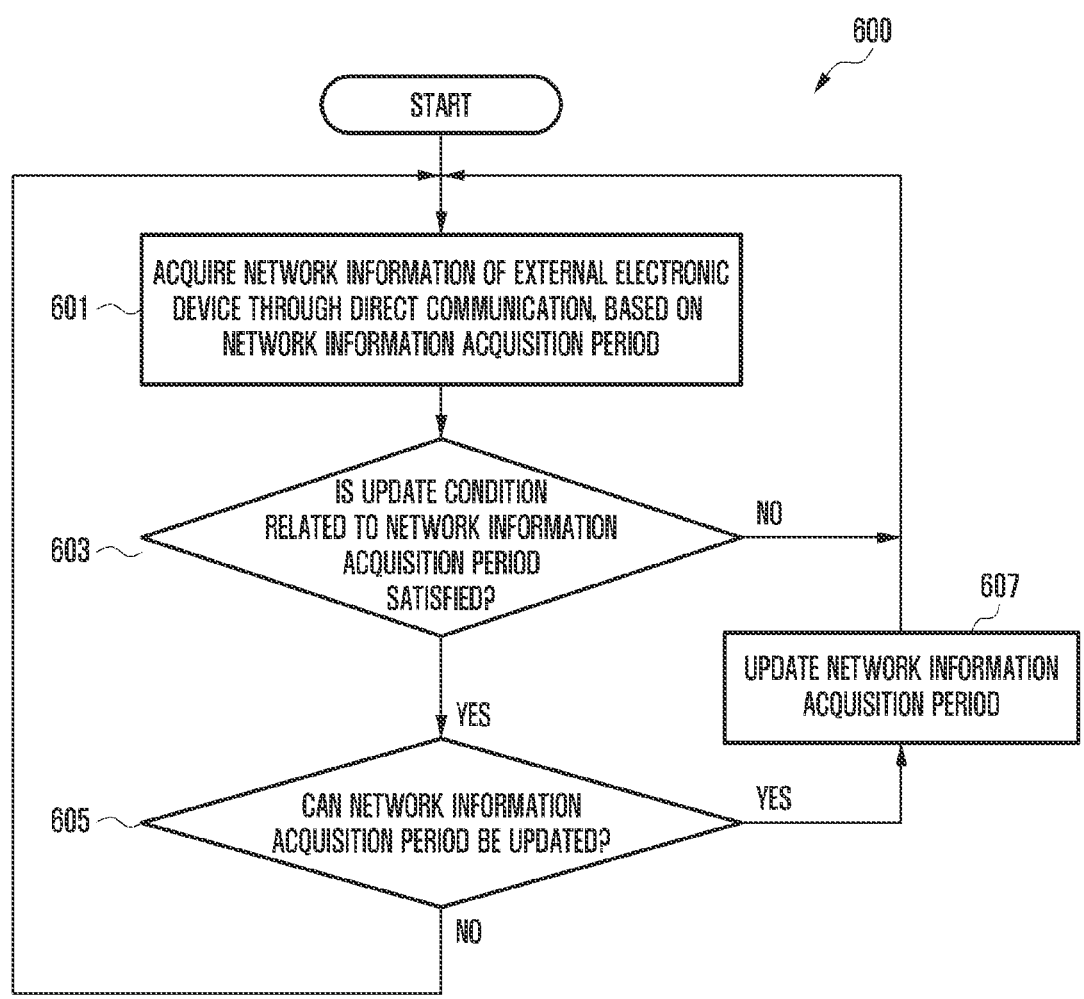
FIG. 6 is a flowchart illustrating an example process in which the electronic device acquires network information of an external electronic device according to various embodiments.

FIG. 6 is a flowchart 600 illustrating an example process in which the electronic device acquires network information of the external electronic device according to various embodiments. According to an embodiment, at least some of FIG. 6 may be a detailed operation of operation 401 of FIG. 4. In the following embodiments, respective operations may be sequentially performed but the sequential performance is not necessary. For example, orders of the operations may be changed, and at least two operations may be performed in parallel. For example, the electronic device of FIG. 6 may be the electronic device 101 of FIG. 1, 2, or 3.

According to various embodiments made with reference to FIG. 6, the electronic device (for example, the processor 120 of FIG. 1 or the processor 300 of FIG. 3) may periodically acquire network information of at least one external electronic device 220 through direct communication based on a predetermined network information acquisition period in operation 601. According to an embodiment, the processor 300 may control the second communication circuit 320 to transmit a request message related to network information based on a predetermined network information acquisition period. The processor 300 may identify network information of at least one external electronic device 220 in a response message related to the network information received through the second communication circuit 320 in response to the request message related to the network information.

According to various embodiments, the electronic device (for example, the processor 120 or 300) may identify whether an update condition related to the network information acquisition period is satisfied in operation 603. According to an embodiment, the processor 300 may identify whether a time during which the service area (for example, country) of the electronic device 101 is maintained satisfies the update condition related to the network information acquisition period.

According to various embodiments, when it is determined that the update condition related to the network information acquisition period is not satisfied (for example, 'No' of operation 603), the electronic device (for example, the processor 120 or 300) may periodically acquire the network information of at least one external electronic device 220 through direct communication based on the predetermined information acquisition period in operation 601. According to an embodiment, when the time during which the service area (for example, country) of the electronic device 101 is maintained is equal to or shorter than a predetermined reference maintenance time, the processor 300 may determine that the update condition related to the network information acquisition period is not satisfied.

According to various embodiments, when it is determined that the update condition related to the network information acquisition period is not satisfied (for example, 'Yes' of operation 603), the electronic device (for example, the processor 120 or 300) may identify whether the network information acquisition period can be updated in operation 605. According to an embodiment, when the time during which the service area (for example, country) of the electronic device 101 is maintained is longer than a predetermined reference maintenance time, the processor 300 may determine that the update condition related to the network information acquisition period is satisfied. According to an embodiment, when it is determined that the update condition related to the network information acquisition period is satisfied, the processor 300 may identify whether the network information acquisition period configured for acquiring the network information of the external electronic device 220 is configured as a maximum period. For example, when the network information acquisition period configured for acquiring the network information of the external electronic device 220 is configured as the maximum period, the processor 300 may determine that the update of the network information acquisition period is limited. For example, when the network information acquisition period configured for acquiring the network information of the external electronic device 220 is not configured as the maximum period, the processor 300 may determine that the update of the network information acquisition period can be updated.

According to various embodiments, when it is determined that the network information acquisition period cannot be updated (for example, 'No' of operation 605), the electronic device (for example, the processor 120 or 300) may periodically acquire network information of at least one external electronic device 220 through direct communication based on the predetermined network information acquisition period in operation 601.

According to various embodiments, when it is determined that the network information acquisition period can be updated (for example, 'Yes' of operation 605), the electronic device (for example, the processor 120 or 300) may update the network information acquisition period in operation 607. According to an embodiment, the processor 300 may expand the predetermined period for acquiring the network information of the external electronic device 220 by a predetermined interval. For example, the predetermined interval may vary depending on the time during which the service area (for example, country) of the electronic device 101 is maintained.

According to various embodiments, the electronic device (for example, the processor 120 or 300) may periodically acquire network information of at least one external electronic device 220 through direct communication based on the updated network information acquisition period.

According to various embodiments, when the network information acquisition period is updated, the electronic device 101 may initialize the time during which the service area (for example, country) of the electronic device 101 is maintained in order to repeatedly determine whether the network information acquisition period is updated.

According to various embodiments, when the network information acquisition period is updated, the electronic device 101 may update a predetermined reference maintenance time for determining whether the update condition related to the network information acquisition period is satisfied in order to repeatedly determine whether the network information acquisition period is updated.

Figure 7:
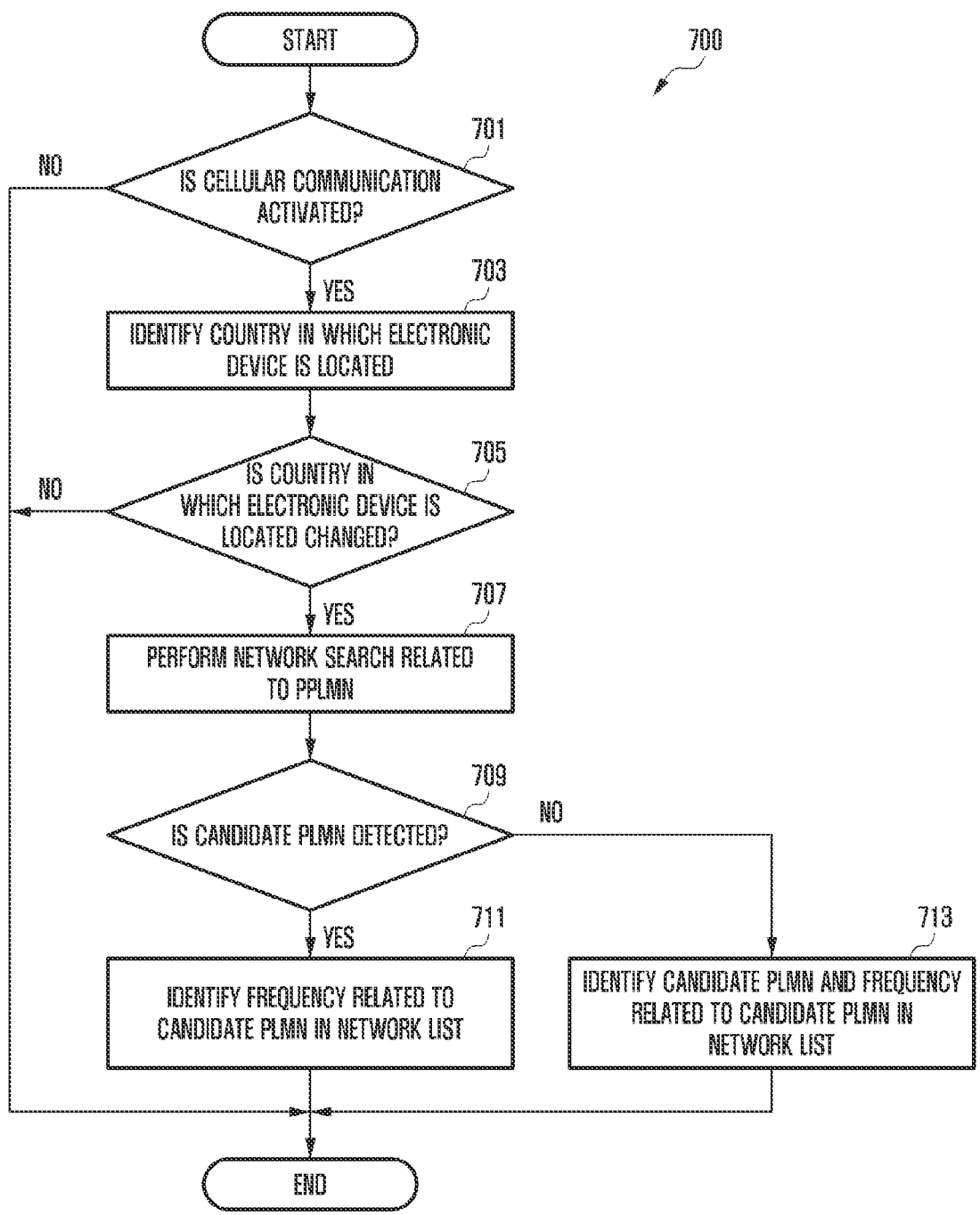
FIG. 7 is a flowchart illustrating an example process in which the electronic device selects a frequency for a network search according to various embodiments.

FIG. 7 is a flowchart 700 illustrating an example process in which the electronic device selects a frequency for a network search according to various embodiments. According to an embodiment, at least some of FIG. 7 may be a detailed operation of operations 405 and 407 of FIG. 4. In the following embodiments, respective operations may be sequentially performed but the sequential performance is not necessary. For example, orders of the operations may be changed, and at least two operations may be performed in parallel. For example, the electronic device of FIG. 7 may be the electronic device 101 of FIG. 1, 2, or 3.

According to various embodiments made with reference to FIG. 7, the electronic device (for example, the processor 120 of FIG. 1 or the processor 300 of FIG. 3) may identify whether cellular communication of the electronic device 101 is activated in operation 701. According to an embodiment, when power is supplied to the electronic device 101 (for example, power on), the processor 300 may determine that the first communication circuit 310 in the inactive state switches to the active state and thus cellular communication of the electronic device 101 is activated. According to an embodiment, when a flight mode of the electronic device 101 is released, the processor 300 may determine that the first communication circuit 310 in the inactive state switches to the active state and thus cellular communication of the electronic device 101 is activated. According to an embodiment, when a menu related to activation of a cellular mode of the electronic device 101 is configured, the processor 300 may determine that the first communication circuit 310 in the inactive state switches to the active state and thus cellular communication of the electronic device 101 is activated.

According to various embodiments, when cellular communication of the electronic device 101 is activated (for example, 'Yes' of operation 701), the electronic device (for example, the processor 120 or 300) may identify a country (for example, service area) in which the electronic device 101 is located in operation 703. According to an embodiment, when cellular communication of the electronic device 101 is activated, the processor 300 may identify the country (for example, service area) in which the electronic device 101 is located based on information related to an MCC and/or an MNC of the area in which the electronic device 101 is located, acquired through a network search related to a registered PLMN (RPLMN) through the first communication circuit 310.

According to various embodiments, the electronic device (for example, the processor 120 or 300) may identify whether the country (for example, service area) in which the electronic device 101 is located is changed in operation 705. According to an embodiment, when the MCC of the cell detected through the network search is different from the MCC of the registered PLMN stored in the electronic device 101 (or SIM), the processor 300 may determine that the country (for example, service area) in which the electronic device 101 is located is changed. According to an embodiment, when the MCC of the cell detected through the network search is the same as the MCC of the registered PLMN stored in the electronic device 101 (or SIM), the processor 300 may determine that the country (for example, service area) in which the electronic device 101 is located is not changed.

According to various embodiments, when it is determined that the country (for example, service area) in which the electronic device 101 is located is changed (for example, 'Yes' of operation 705), the electronic device (for example, the processor 120 or 300) may perform a network search related to at least one preferred PLMN (PPLMN) corresponding to the country (for example, service area) in which the electronic device 101 is located in operation 707. According to an embodiment, when it is determined that the country in which the electronic device 101 is located is changed, the processor 300 may identify at least one preferred PLMN corresponding to the country (for example, service area) in which the electronic device 101 is located in the subscriber identity module of the electronic device 101. The processor 300 may control the first communication circuit 310 to perform the network search related to the preferred PLMN having the highest priority among at least one preferred PLMN. For example, the network search related to the preferred PLMN may include a series of operations for performing a network search related to a frequency band (or a frequency) of the preferred PLMN.

According to various embodiments, the electronic device (for example, the processor 120 or 300) may identify whether a candidate PLMN is detected through the network search related to the preferred PLMN in operation 709. According to an embodiment, when a network satisfying a predetermined quality is detected through the network search related to the preferred PLMN, the processor 300 may determine that the candidate PLMN is detected. According to an embodiment, when a network satisfying a predetermined quality is not detected through the network search related to the preferred PLMN, the processor 300 may determine that the candidate PLMN is not detected. For example, the candidate PLMN may indicate a PLMN for which the electronic device 101 attempts registration.

According to various embodiments, when the candidate PLMN is detected through the network search related to the preferred PLMN (for example, 'Yes' of operation 709), the electronic device (for example, the processor 120 or 300) may identify a frequency related to the candidate PLMN detected through the network search related to the country (for example, service area) in which the electronic device 101 is located and the preferred PLMN in the network list of the electronic device 101 in operation 711. According to an embodiment, the processor 300 may select a frequency corresponding to the candidate PLMN detected through the network search related to the country (for example, service area) in which the electronic device 101 is located and the preferred PLMN in the network list of the electronic device 101 based on a priority configured according to information related to the time point at which registration in the network is performed and/or the network service provider stored in the subscriber identity module of the electronic device 101.

According to various embodiments, when the candidate PLMN is not detected through the network search related to the preferred PLMN (for example, 'No' of operation 709), the electronic device (for example, the processor 120 or 300) may identify the candidate PLMN corresponding to the country (for example, service area) in which the electronic device 101 is located and the frequency corresponding to the candidate PLMN in the network list of the electronic device 101 in operation 713. According to an embodiment, the processor 300 may identify at least one PLMN corresponding to the country (for example, service area) in which the electronic device 101 is located in the network list of the electronic device 101. The processor 300 may select, as the candidate PLMN, one of at least one PLMN corresponding to the list of the country (for example, service area) in which the electronic device 101 is located based on the priority configured according to the information related to the time point at which registration in the network is performed and/or the network service provider stored in the subscriber identity module of the electronic device 101. The processor 300 may select the frequency corresponding to the candidate PLMN from the network list of the electronic device 101 based on the priority configured according to the information related to the time point at which registration in the network is performed and/or the network service provider stored in the subscriber identity module of the electronic device 101.

According to various embodiments, when it is determined that cellular communication of the electronic device 101 is not activated (for example, 'No' of operation 701) or the country in which the electronic device 101 is located is not changed (for example, 'No' of operation 705), the electronic device (for example, the processor 120 or 300) may end the process for selecting a frequency for a network search.

According to various embodiments, the electronic device 101 may select a cell which the electronic device 101 will access through the network search related to the frequency corresponding to the candidate PLMN. The electronic device 101 may perform a process of access the cell selected through the network search related to the frequency corresponding to the candidate PLMN.

Figure 8:
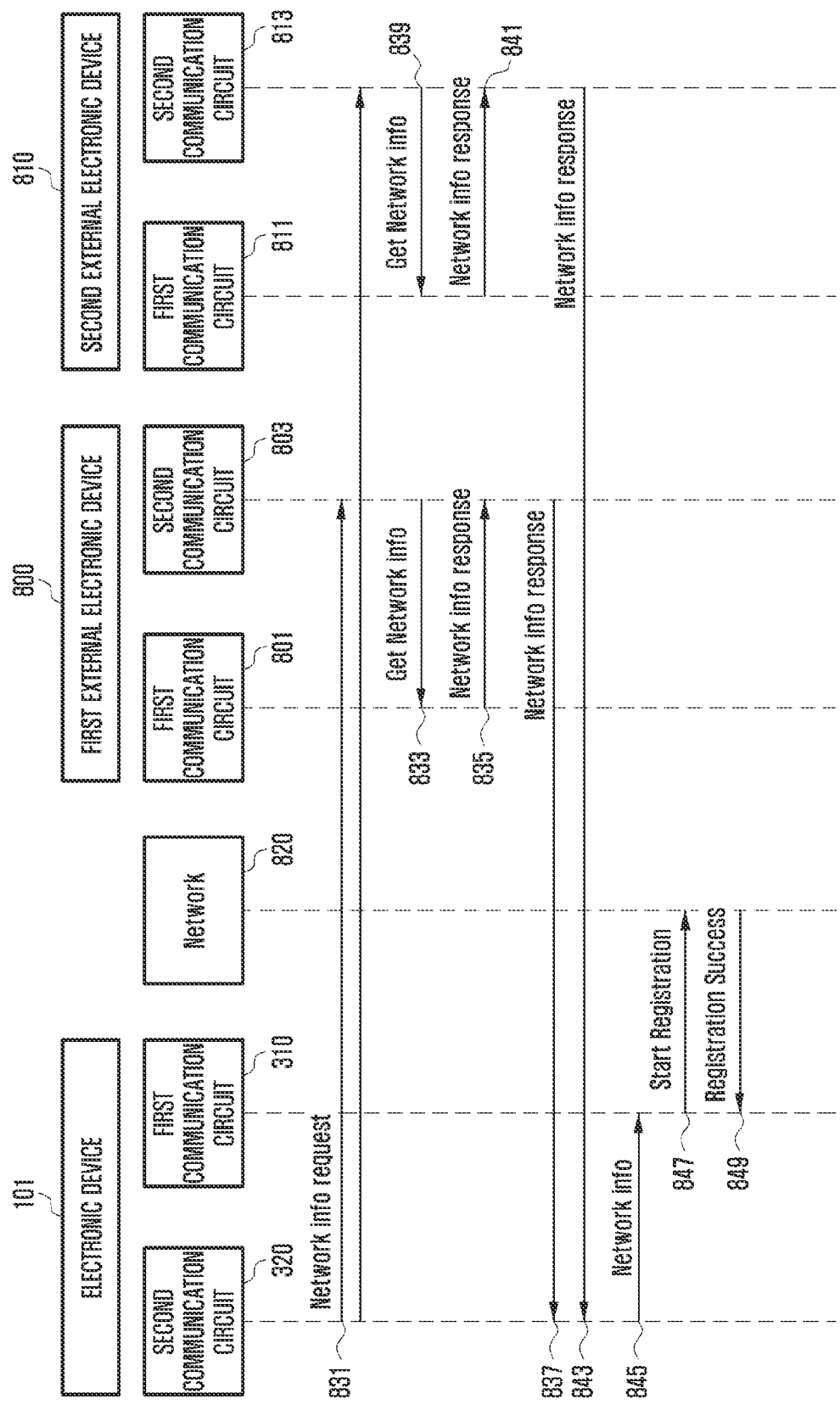
FIG. 8 is a signal flow diagram illustrating an example process in which the electronic device acquires network information of the external electronic device through direct communication according to various embodiments.

FIG. 8 is a signal flow diagram illustrating an example in which the electronic device acquires network information of the external electronic device through direct communication according to various embodiments.

According to various embodiments made with reference to FIG. 8, the electronic device 101 may transmit a request message related to network information (network info request) to at least one external electronic device (for example, the first external electronic device 800 and a second external electronic device 810) through direct communication using the second communication circuit 320 in operation 831. According to an embodiment, the second communication circuit 320 of the electronic device 101 may broadcast the request message related to the network information through direct communication when a predetermined network information acquisition period arrives.

According to various embodiments, a first external electronic device 800 (for example, the external electronic device 220 of FIG. 2) may transmit network information of the first external electronic device 800 to the electronic device 101 based on the request message related to the network information in operation 833, operation 835, and operation 837. According to an embodiment, when receiving the request message related to the network information (network info request), a second communication circuit 803 of the first external electronic device 800 may make a request for the network information to a first communication circuit 801 of the first external electronic device 800 (get network info) in operation 833. The first communication circuit 801 of the first external electronic device 800 may transmit the network information of the first external electronic device 800 (network info response) to the second communication circuit 803 in response to the network information request from the second communication circuit 803 in operation 835. The second communication circuit 803 of the first external electronic device 800 may transmit a response message related to the network information (network info response) including the network information of the first external electronic device 800 to the electronic device 101 through direct communication in response to the request message related to the network information in operation 837. For example, the first communication circuit 801 may support cellular communication of the first external electronic device 800. For example, the second communication circuit 803 may support direct communication of the first external electronic device 800.

According to various embodiments, a second external electronic device 810 (for example, the external electronic device 220 of FIG. 2) may transmit network information of the second external electronic device 810 to the electronic device 101 based on a request message related to the network information in operation 839, operation 841, and operation 843. According to an embodiment, when receiving the request message related to the network information (network info request), a second communication circuit 813 of the second external electronic device 810 may make a request for the network information to a first communication circuit 811 of the second external electronic device 810 (get network info) in operation 839. The first communication circuit 811 of the second external electronic device 810 may transmit the network information of the second external electronic device 810 (network info response) to the second communication circuit 813 in response to the network information request from the second communication circuit 813 in operation 841. The second communication circuit 813 of the second external electronic device 810 may transmit a response message related to the network information (network info response) including the network information of the second external electronic device 810 to the electronic device 101 through direct communication in response to the request message related to the network information in operation 843. For example, the first communication circuit 811 may support cellular communication of the second external electronic device 810. For example, the second communication circuit 813 may support direct communication of the second external electronic device 810.

According to various embodiments, the electronic device 101 may generate and/or update the network list of the electronic device 101 based on the network information of the first external electronic device 800 acquired through direct communication and the second external electronic device 810. According to an embodiment, the second communication circuit 320 of the electronic device 101 may transmit the network information of the first external electronic device 800 acquired through direct communication and the second external electronic device 810 to the first communication circuit 310 in operation 845. The first communication circuit 310 (or the processor 300) may generate and/or update the network list of the electronic device 101 based on the network information of the first external electronic device 800 and the second external electronic device 810.

According to various embodiments, when it is determined that the electronic device 101 is in the roaming state, the electronic device 101 may identify a frequency corresponding to a service area (for example, country) in which the electronic device 101 is located based on the network list of the electronic device 101. The electronic device 101 may perform a procedure of registration in the network through a cell detected by a network search related to the frequency corresponding to the service area (for example, country) in which the electronic device 101 is located in operation 847 and operation 849. According to an embodiment, the first communication circuit 310 of the electronic device 101 may transmit a message related to a request (or an access request) for registration in a cell of the network 820 detected through the network search in operation 847. When receiving a message related to registration acceptance (or access acceptance) from the network 820 in response to the message related to the registration request (or access request) through the first communication circuit 310 in operation 849, the electronic device 101 may determine that the registration in the network is completed through the cell.

Figure 9:
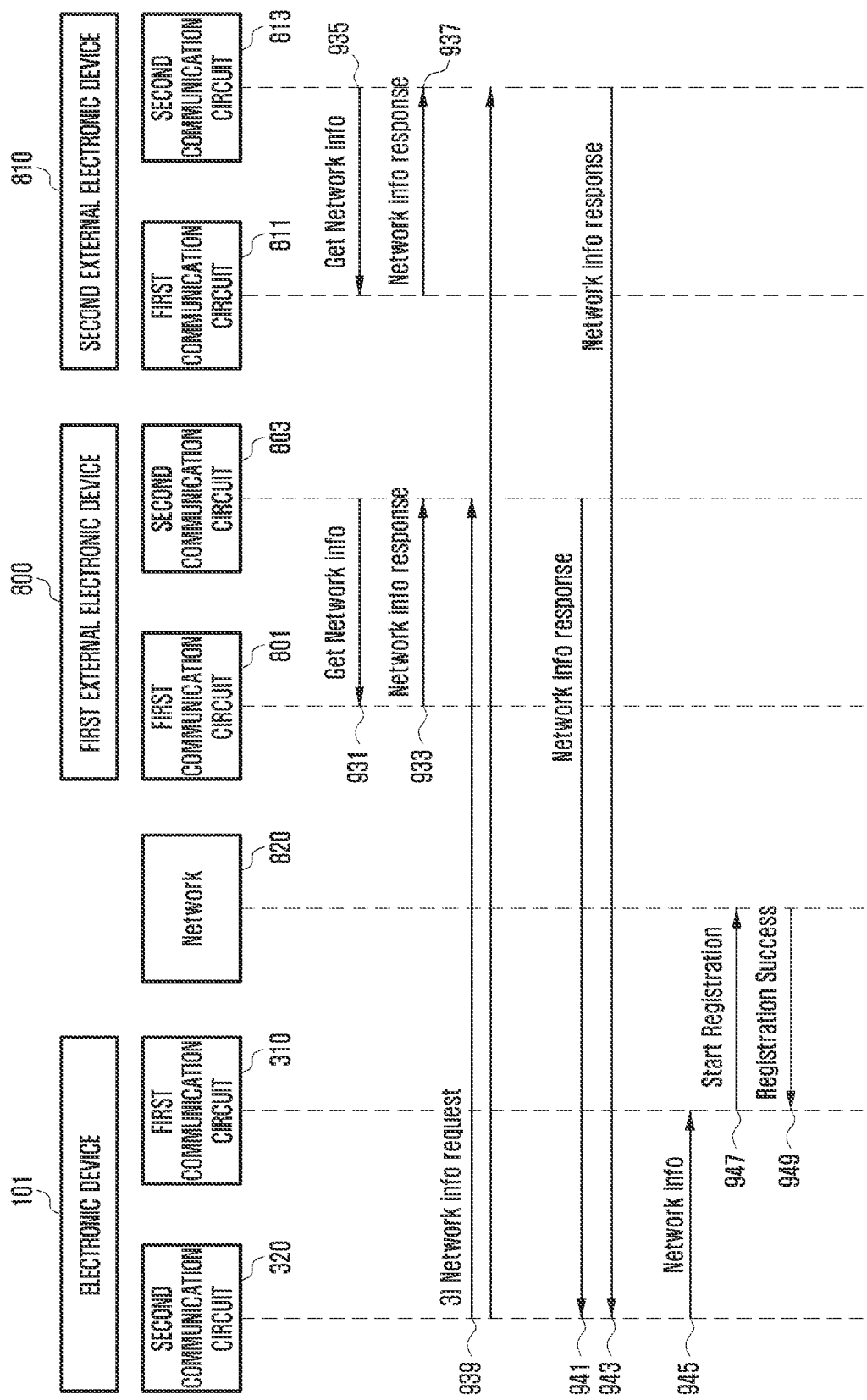
FIG. 9 is a signal flow diagram illustrating an example process in which the electronic device acquires network information of the external electronic device through direct communication according to various embodiments.

FIG. 9 is a signal flow diagram illustrating example process in which the electronic device acquires network information of the external electronic device through direct communication according to various embodiments.

According to various embodiments made with reference to FIG. 9, the first external electronic device 800 (for example, the external electronic device 220 of FIG. 2) may periodically identify network information of the first external electronic device 800 based on a predetermined second period in operation 931 and operation 933. According to an embodiment, the second communication circuit 803 of the first external electronic device 800 may make a request for network information (get network info) to the first communication circuit 801 of the first external electronic device 800 when a network information identification period based on the predetermined second period arrives in operation 931. The first communication circuit 801 of the first external electronic device 800 may transmit the network information of the first external electronic device 800 (network info response) to the second communication circuit 803 in response to the network information request from the second communication circuit 803 in operation 933.

According to various embodiments, the second external electronic device 810 (for example, the external electronic device 220 of FIG. 2) may periodically identify network information of the second external electronic device 810 based on a predetermined third period in operation 935 and operation 937. According to an embodiment, the second communication circuit 813 of the second external electronic device 810 may make a request for network information (get network info) to the first communication circuit 811 of the second external electronic device 810 when a network information identification period based on the predetermined third period arrives in operation 935. The first communication circuit 811 of the second external electronic device 810 may transmit the network information of the second external electronic device 810 (network info response) to the second communication circuit 813 in response to the network information request from the second communication circuit 813 in operation 937. For example, the predetermined third period may be the same as or different from the second period.

According to various embodiments, the electronic device 101 may transmit a request message related to network information (network info request) through direct communication using the second communication circuit 320 in operation 939. According to an embodiment, when the predetermined network information acquisition period arrives, the second communication circuit 320 of the electronic device 101 may broadcast the request message related to the network information through direct communication.

According to various embodiments, the first external electronic device 800 (For example, the external electronic device 220 of FIG. 2) may transmit network information of the first external electronic device 800 to the electronic device 101 based on the request message related to the network information in operation 941. According to an embodiment, when receiving the request message related to the network information, the second communication circuit 803 of the first external electronic device 800 may transmit a response message related to the network information (network info response) including the network information of the first external electronic device 800 identified according to the second period to the electronic device 101 through direct communication in operation 941.

According to various embodiments, the second external electronic device 810 (for example, the external electronic device 220 of FIG. 2) may transmit network information of the first external electronic device 810 to the electronic device 101 based on the request message related to the network information in operation 943. According to an embodiment, when the request message related to the network information of the second external electronic device 810 is received, a response message related to the network information (network info response) including the network information of the second external electronic device 810 identified according to the predetermined third period may be transmitted to the electronic device 101 through direct communication in operation 943.

According to various embodiments, the electronic device 101 may generate and/or update the network list of the electronic device 101 based on the network information of the first external electronic device 800 acquired through direct communication and the second external electronic device 810. According to an embodiment, the second communication circuit 320 of the electronic device 101 may transmit the network information of the first external electronic device 800 acquired through direct communication and the second external electronic device 810 to the first communication circuit 310 in operation 945. The first communication circuit 310 (or the processor 300) may generate and/or update the network list of the electronic device 101 based on the network information of the first external electronic device 800 and the second external electronic device 810.

According to various embodiments, when it is determined that the electronic device 101 is in the roaming state, the electronic device 101 may identify a frequency corresponding to a service area (for example, country) in which the electronic device 101 is located based on the network list of the electronic device 101. The electronic device 101 may perform a procedure of registration in the network 820 (or access procedure) through the cell detected by the network search related to the frequency corresponding to the service area (for example, country) in which the electronic device 101 is located in operation 947 and operation 949.

Figure 10:
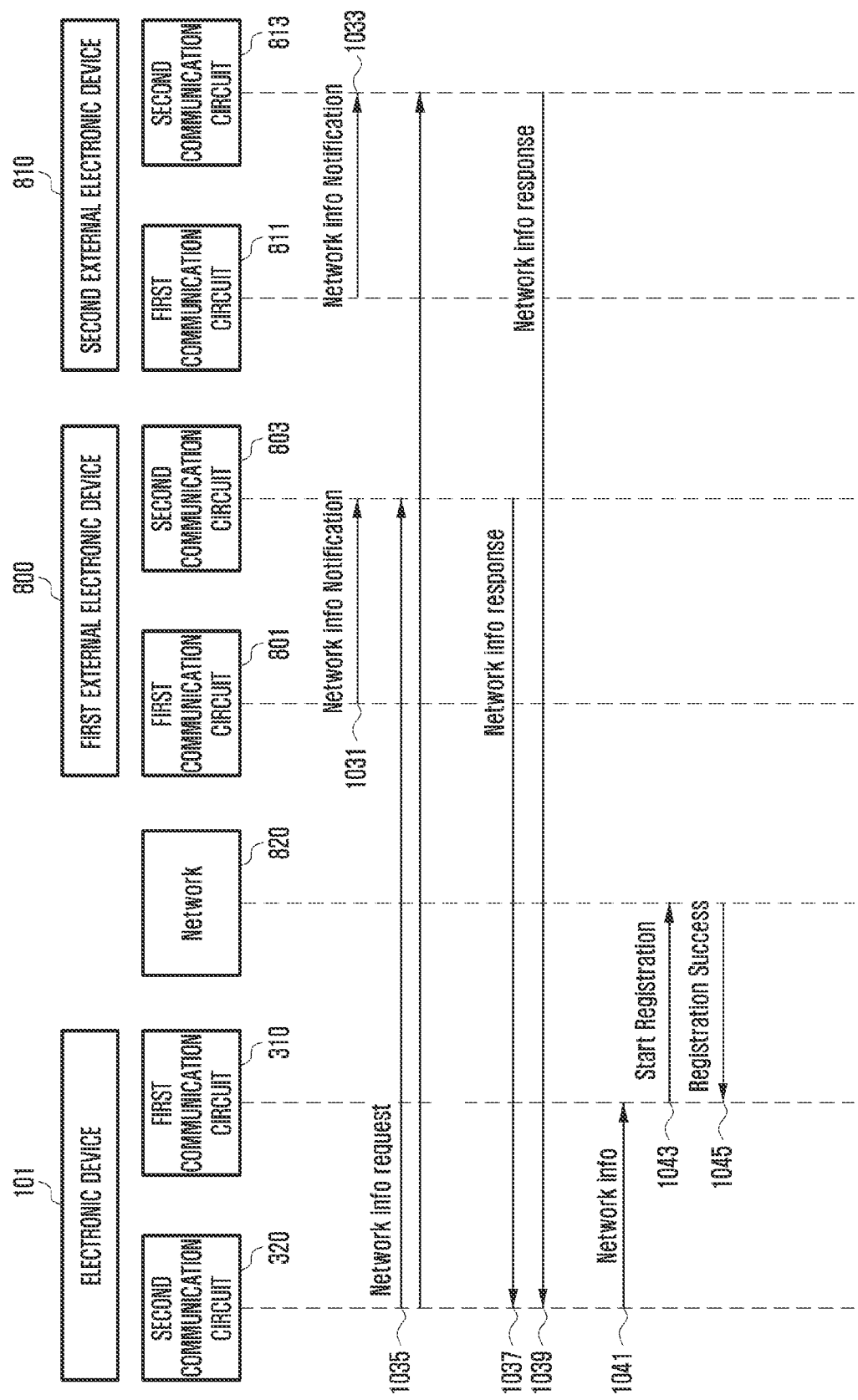
FIG. 10 is signal flow diagram illustrating an example process in which the electronic device acquires network information of the external electronic device through direct communication according to various embodiments.

FIG. 10 is signal flow diagram illustrating an example process in which the electronic device acquires network information of the external electronic device through direct communication according to various embodiments.

According to various embodiments made with reference to FIG. 10, the first external electronic device 800 (for example, the external electronic device 220 of FIG. 2) may periodically identify network information of the first external electronic device 800 based on a predetermined second period in operation 1031. According to an embodiment, the first communication circuit 801 of the first external electronic device 800 may transmit the network information of the first external electronic device 800 (get network info) to the second communication circuit 803 when a network information identification period based on the predetermined second period arrives in operation 1031.

According to various embodiments, the second external electronic device 810 (for example, the external electronic device 220 of FIG. 2) may periodically identify network information of the second external electronic device 810 based on a predetermined third period in operation 1033. According to an embodiment, the first communication circuit 810 of the second external electronic device 810 may transmit the network information of the second external electronic device 810 (get network info) to the second communication circuit 813 when a network information identification period based on the predetermined third period arrives in operation 1033.

According to various embodiments, the electronic device 101 may transmit a request message related to network information (network info request) through direct communication using the second communication circuit 320 in operation 1035. According to an embodiment, when the predetermined network information acquisition period arrives, the second communication circuit 320 of the electronic device 101 may broadcast the request message related to the network information through direct communication.

According to various embodiments, the first external electronic device 800 (For example, the external electronic device 220 of FIG. 2) may transmit network information of the first external electronic device 800 to the electronic device 101 based on the request message related to the network information in operation 1037. According to an embodiment, when receiving the request message related to the network information, the second communication circuit 803 of the first external electronic device 800 may transmit a response message related to the network information (network info response) including the network information of the first external electronic device 800 identified according to the predetermined second period to the electronic device 101 through direct communication in operation 1037.

According to various embodiments, the second external electronic device 810 (for example, the external electronic device 220 of FIG. 2) may transmit network information of the first external electronic device 810 to the electronic device 101 based on the request message related to the network information in operation 1039. According to an embodiment, when receiving the request message related to the network information of the second external electronic device 810, a response message related to the network information (network info response) including the identified network information of the second external electronic device 810 may be transmitted to the electronic device 101 through direct communication according to a predetermined third period in operation 1039.

According to various embodiments, the electronic device 101 may generate and/or update the network list of the electronic device 101 based on the network information of the first external electronic device 800 acquired through direct communication and the second external electronic device 810. According to an embodiment, the second communication circuit 320 of the electronic device 101 may transmit the network information of the first external electronic device 800 acquired through direct communication and the second external electronic device 810 to the first communication circuit 310 in operation 1041. The first communication circuit 310 (or the processor 300) may generate and/or update the network list of the electronic device 101 based on the network information of the first external electronic device 800 and the second external electronic device 810.

According to various embodiments, when it is determined that the electronic device 101 is in the roaming state, the electronic device 101 may identify a frequency corresponding to a service area (for example, country) in which the electronic device 101 is located based on the network list of the electronic device 101. The electronic device 101 may perform a procedure of registration in the network 820 (or access procedure) through the cell detected by the network search related to the frequency corresponding to the service area (for example, country) in which the electronic device 101 is located in operation 1043 and operation 1045.

Figure 11:
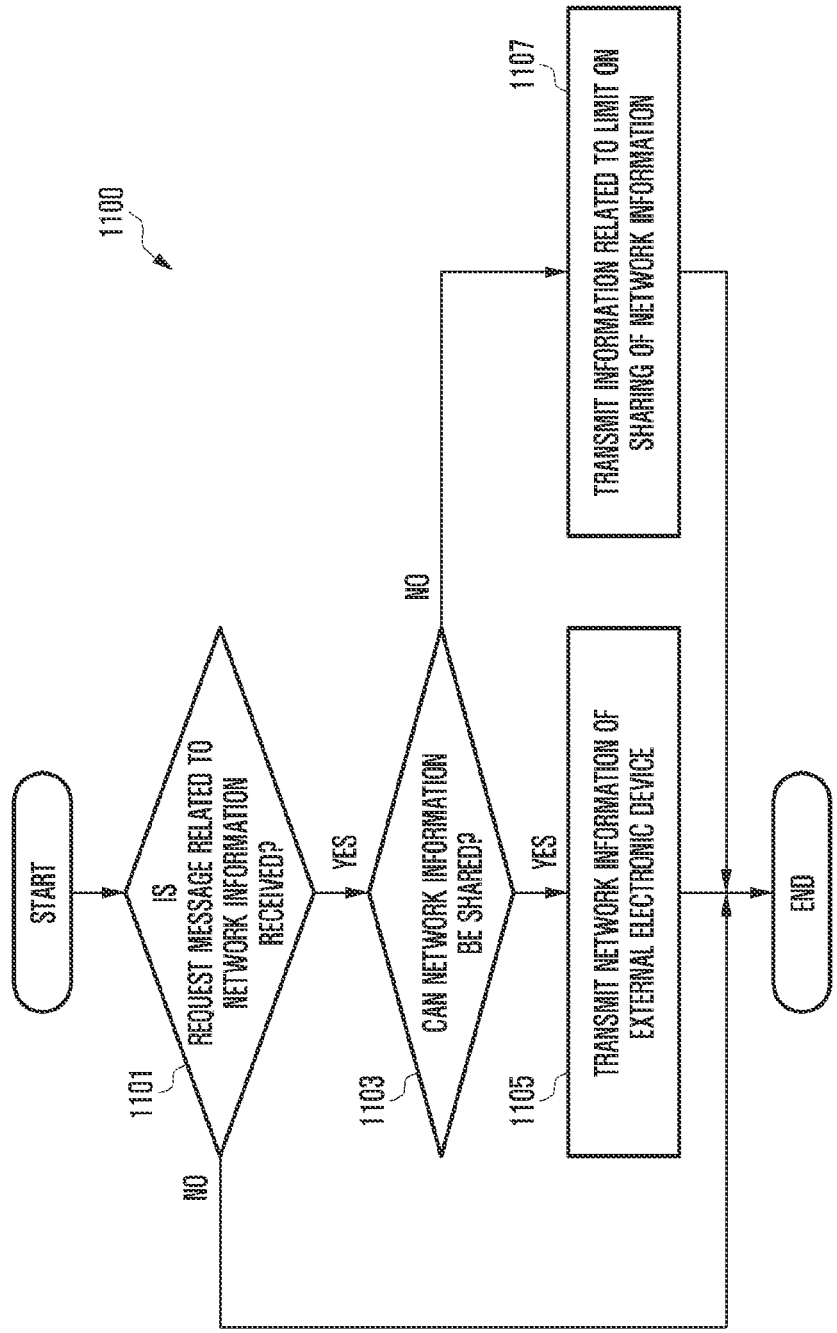
FIG. 11 is a flowchart illustrating an example process in which the external electronic device shares network information according to various embodiments.

FIG. 11 is a flowchart 1100 illustrating an example process in which the external electronic device shares network information according to various embodiments. In the following embodiments, respective operations may be sequentially performed but the sequential performance is not necessary. For example, orders of the operations may be changed, and at least two operations may be performed in parallel. For example, the external electronic device of FIG. 11 may be the electronic device 101 of FIG. 1 or the external electronic device 220 of FIG. 2.

According to various embodiments made with reference to FIG. 11, the external electronic device (for example, the external electronic device 220 of FIG. 2) may identify whether a request message related to network information is received through direct communication in operation 1101. For example, the request message related to the network information may include indication information related to the request for the network information.

According to various embodiments, when the request message related to the network information is not received through direct communication ('No' of operation 1101), the external electronic device may end the process for sharing the network information of the external electronic device.

According to various embodiments, when the request message related to the network information is received through direct communication ('Yes' of operation 1101), the external electronic device may determine whether to share the network information with the electronic device 101 based on the request message related to the network information in operation 1103. According to an embodiment, when receiving the request message related to the network information, the external electronic device 220 may identify whether the request message related to the network information satisfies a predetermined sharing condition. For example, when it is determined that the request message related to the network information satisfies the predetermined sharing condition, the external electronic device 220 may determine whether to share the network information with the electronic device 101. For example, the state in which the predetermined sharing condition is satisfied may include a state in which identification information of the electronic device 101 related to direct communication is included in identification information configured for sharing the network information. For example, when it is determined that the request message related to the network information does not satisfy the predetermined sharing condition, the external electronic device 220 may determine whether the network information is not shared with the electronic device 101. For example, the state in which the predetermined sharing condition is not satisfied may include a state in which identification information of the electronic device 101 related to direct communication is not included in identification information configured for sharing the network information. For example, the identification information of the electronic device 101 may include a communication service provider (for example, a home PLMN) operating the cellular network which can be supported by the electronic device 101, a manufacturer of the electronic device 101, and/or a predefined sharing identity (ID).

According to various embodiments, when it is determined that the network information is shared with the electronic device 101 (for example, 'Yes' of operation 1103), the external electronic device may transmit the network information of the external electronic device 220 through direct communication in operation 1105. According to an embodiment, when it is determined that the network information is shared with the electronic device 101, the external electronic device 220 may transmit a response message related to the network information including the network information of the external electronic device 220 to the electronic device 101 through direct communication.

According to an embodiment, when it is determined that the network information is not shared with the electronic device 101 (for example, 'No' of operation 1103), the external electronic device may transmit information related to the limit on sharing of the network information through direct communication in operation 1107. According to an embodiment, when it is determined that the network information is not shared with the electronic device 101, the external electronic device 220 may transmit a response message including the information related to the limit on sharing of the network information to the electronic device 101 through direct communication.

According to various example embodiments, a method of operating an electronic device (for example, the electronic device 101 of FIG. 1, 2, or 3) may include: acquiring network information of at least one external electronic device through direct communication, acquiring a network list corresponding to each of at least one service area, based on the network information of the at least one external electronic device, based on cellular communication of the electronic device being activated, acquiring information related to a service area in which the electronic device is located through the cellular communication, based on determining that the service area of the electronic device is changed, acquiring a frequency corresponding to the service area in which the electronic device is located, based on the network list, performing a network search based on the frequency corresponding to the service area in which the electronic device is located, and accessing a cell detected through the network search.

According to various example embodiments, the acquiring the network list may include generating and/or updating the network list corresponding to each of the at least one service area, based on network information of the electronic device stored in the memory and/or the network information of the at least one external electronic device.

According to various example embodiments, the network information of the electronic device may include at least one piece of information related to a public land mobile network (PLMN) in which the electronic device is registered or was registered, a radio access technology (RAT), a network frequency, or a registration time point.

According to various example embodiments, the network list corresponding to each service area may be arranged based on the network registration time point.

According to various example embodiments, the network information of the external electronic device may include at least one piece of information related to a PLMN in which the external electronic device is registered or was registered, an RAT, a network frequency, or a registration time point.

According to various example embodiments, acquiring the frequency may include based on determining that the service area of the electronic device is changed, acquiring information related to a registered PLMN of the service area in which the electronic device is located and based on a candidate PLMN being detected through a network search related to the registered PLMN, selecting a frequency corresponding to the service area in which the electronic device is located and the candidate PLMN from the network list.

According to various example embodiments, the method may further include based on no candidate PLMN being detected through the network search related to the registered PLMN, selecting a candidate PLMN corresponding to the service area in which the electronic device is located from the network list and selecting the frequency corresponding to the service area in which the electronic device is located and the candidate PLMN from the network list.

According to various example embodiments, the acquiring the network information may include periodically acquiring the network information of the at least one external electronic device based on a specified period through the direct communication using the second communication circuit.

According to various example embodiments, the specified period may be updated based on a time during which the service area of the electronic device is maintained and/or a number of acquisitions of the network information of the external electronic device.

According to various example embodiments, the acquiring the network information may include acquiring schedule information related to the electronic device and based on the electronic device being scheduled to move to another service area, based on the information related to the schedule, periodically acquiring the network information of the at least one external electronic device based on a specified period through the direct communication using the second communication circuit.

Embodiments of the disclosure and drawings are presented to describe the technical content according to various example embodiments of the disclosure and provide specific examples to aid understanding the disclosure, but do not intend to limit the scope of the disclosure. Therefore, the scope of various embodiments of the disclosure should be understood such that all changes or changed forms derived based on the technical idea of the disclosure as well as the embodiments disclosed herein are included in the range of various embodiments of the disclosure.

Further, while the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   memory storing instructions;
   a first communication circuit configured to support cellular communication;
   a second communication circuit configured to support Bluetooth low energy (BLE) communication; and
   at least one processor operatively connected to the memory, the first communication circuit, and the second communication circuit,
   wherein the instructions, when executed by the least one processor, cause the electronic device to:
   acquire network information of at least one external electronic device through the BLE communication while the electronic device is located in a first country, wherein the network information includes information related to at least one of a public land mobile network (PLMN) where the external electronic device was previously registered or an radio access technology (RAT) of the PLMN,
   generate at least one-network list corresponding to each of at least one country, based on the acquired network information of the at least one external electronic device, wherein the at least one network list includes information related to frequency available in each of at least one country,
   based on detecting a change of a country
   in which the electronic device is located from the first country to a second country,
   identify a frequency available in the second country based on the at least one network list,
   perform a network search based on the identified frequency, and
   access a cell searched by the network search through the cellular communication.

2. The electronic device of claim 1, wherein the instructions, when executed by the at least one processor, cause the electronic device to:
   generate or update the at least one network list corresponding to each of the at least one country, based on network information of the electronic device stored in the memory and the network information of the at least one external electronic device.

3. The electronic device of claim 2, wherein the network information of the electronic device comprises at least one piece of information related to a public land mobile network (PLMN) in which the electronic device is currently registered or was previously registered, a radio access technology (RAT) of the PLMN in which the electronic device is currently registered or was previously registered, a frequency of a network where the electronic device is currently registered or was previously registered, or a registration time point of the electronic device to the network.

4. The electronic device of claim 1, wherein the network information of the external electronic device further comprises a registration time point of the external electronic device to a network.

5. The electronic device of claim 1, wherein, based on detecting the change of the country in which the electronic device is located from the first country to the second country, the instructions, when executed by the at least one processor, cause the electronic device to:
   identify information related to a preferred public land mobile network (PPLMN) of the second country in which the electronic device is located, and,
   based on a candidate PLMN being searched through a network search related to the PPLMN, select a frequency of the candidate PLMN corresponding to the second country in which the electronic device is located and the candidate PLMN from the at least one network list.

6. The electronic device of claim 5, wherein, based on no candidate PLMN being searched through the network search related to the P PLMN, the instructions, when executed by the at least one processor, cause the electronic device to:
   select a candidate PLMN corresponding to the second country in which the electronic device is located from the at least one network list, and
   select the frequency of the candidate PLMN corresponding to the second country in which the electronic device is located and the candidate PLMN from the at least one network list.

7. The electronic device of claim 1, wherein the instructions, when executed by the at least one processor, cause the electronic device to periodically acquire the network information of the at least one external electronic device based on a specified period through the BLE communication using the second communication circuit.

8. The electronic device of claim 7, wherein the memory storing instructions, when executed by the at least one processor, cause the electronic device to update the specified period, based on a time during which the first country of the electronic device is maintained or a number of acquisitions of the network information of the external electronic device.

9. The electronic device of claim 1, wherein the instructions, when executed by the at least one processor, cause the electronic device to:
   acquire information related to a schedule stored in the memory and,
   based on the electronic device being scheduled to move to the second country, based on the information related to the schedule, periodically acquire the network information of the at least one external electronic device based on a specified period through the BLE communication using the second communication circuit.

10. A method of operating an electronic device, the method comprising:
    acquiring network information of at least one external electronic device through Bluetooth low energy (BLE) communication while the electronic device is located in a first country, wherein the network information includes information related to at least one of a public land mobile network (PLMN) where the external electronic device was previously registered or an radio access technology (RAT) of the PLMN;
    generating at least one network list corresponding to each of at least one country, based on the network information of the at least one external electronic device, wherein the at least one network list includes information related to frequency available in each of at least one country;
    based on detecting a change of a country
    in which the electronic device is located from the first country to a second country;
    identifying a frequency available in the second country, based on the at least one network list;
    performing a network search based on the identified frequency; and
    accessing a cell searched through the network search.

11. The method of claim 10, wherein the generating of the at least one network list comprises generating or updating the at least one network list corresponding to each of the at least one country, based on network information of the electronic device stored in the memory and the network information of the at least one external electronic device.

12. The method of claim 10, wherein the identifying of the frequency comprises:
based on detecting the change of the country in which the electronic device is located from the first country to the second country, identifying information related to a preferred public land mobile network (PPLMN) of the second country in which the electronic device is located; and
based on a candidate PLMN being searched through a network search related to the PPLMN, selecting a frequency of the candidate PLMN corresponding to the second country in which the electronic device is located and the candidate PLMN from the at least one network list.

13. The method of claim 12, further comprising:
based on no candidate PLMN being searched through the network search related to the PPLMN, selecting a candidate PLMN corresponding to the second country in which the electronic device is located from the at least one network list; and
selecting the frequency of the candidate PLMN corresponding to the second country in which the electronic device is located and the candidate PLMN from the at least one network list.

14. The method of claim 10, wherein the acquiring of the network information comprises periodically acquiring the network information of the at least one external electronic device based on a specified period through the BLE communication.

15. The method of claim 10, wherein the acquiring of the network information comprises:
acquiring schedule information related to the electronic device; and
based on the electronic device being scheduled to move to the second country, based on the information related to the schedule, periodically acquiring the network information of in which the at least one external electronic device based on a specified period through the BLE communication.

16. The method of claim 14, wherein the specified period is updated based on a time during which the first country of the electronic device is maintained or a number of acquisitions of the network information of the external electronic device.

17. The method of claim 11, wherein the network information of the electronic device comprises at least one piece of information related to a public land mobile network (PLMN) in which the electronic device is currently registered or was previously registered, a radio access technology (RAT) of the PLMN in which the electronic device is currently registered or was previously registered, a frequency of a network where the electronic device is currently registered or was previously registered, or a registration time point of the electronic device to the network.

18. The method of claim 10, wherein the at least one network list corresponding to each country is arranged based on a registration time point of the electronic device or the at least one external electronic device to a network.

19. The method of claim 10, wherein the network information of the external electronic device further comprises a registration time point of the external electronic device to the network.

\* \* \* \* \*